(12) United States Patent
Nebel et al.

(10) Patent No.: US 7,725,848 B2
(45) Date of Patent: May 25, 2010

(54) PREDICTABLE DESIGN OF LOW POWER SYSTEMS BY PRE-IMPLEMENTATION ESTIMATION AND OPTIMIZATION

(76) Inventors: Wolfgang Nebel, Theodor-Heuss Str. 16, Oldenburg (DE) 26129; Ansgar Stammermann, Vogelhuttendeich 80, Hamburg (DE) 21107; Domenik Helms, Haarenfeld 56b, Oldenburg (DE) 26121; Eike Schmidt, Julius-Leber-Str. 11, Oldenburg (DE) 26129; Milan Schulte, Eichen Str. 77A, Oldenburg (DE) 26131; Lars Kruse, Schlesische Str. 6, Burgwedel/Fuhrberg (DE) 30938; Gerd von Cölln, Wolthuser Str. 107b, Emden (DE) D-27625; Arne Schulz, Ahornstr. 70, Wehren (DE) 26760

(*) Notice: Subject to any disclaimer, the term of this patent is extended or adjusted under 35 U.S.C. 154(b) by 201 days.

(21) Appl. No.: 11/044,646

(22) Filed: Jan. 27, 2005

(65) Prior Publication Data

US 2005/0204316 A1    Sep. 15, 2005

Related U.S. Application Data

(60) Provisional application No. 60/539,448, filed on Jan. 27, 2004.

(51) Int. Cl.
*G06F 17/50* (2006.01)
*G06F 9/45* (2006.01)

(52) U.S. Cl. .................. 716/4; 716/2; 716/3; 716/5
(58) Field of Classification Search .............. 716/2–5
See application file for complete search history.

(56) References Cited

U.S. PATENT DOCUMENTS

| 5,831,864 | A | 11/1998 | Raghunathan et al. |
| 6,105,139 | A | 8/2000 | Dey et al. |
| 6,151,568 | A | 11/2000 | Allen et al. |

(Continued)

FOREIGN PATENT DOCUMENTS

DE    103 24 565 A1    12/2004

(Continued)

OTHER PUBLICATIONS

Wikipedia.org; "Control flow graph"'; http://en.wikipedia.org/wiki/Control_flow_graph; Oct. 29, 2007.*

(Continued)

*Primary Examiner*—Jack Chiang
*Assistant Examiner*—Suresh Memula

(57) ABSTRACT

A method of designing a low power circuit that implements specified functionality, the method including: analyzing code for an algorithmic description of the specified functionality to generate a design representation of the circuit at the algorithmic level; instrumenting the code for the algorithmic description so as to capture data streams during execution/simulation of the algorithmic description; executing/simulating the instrumented code to generate an activity profile for the algorithmic description, wherein said activity profile includes at least portions of data traces of at least a portion of the executed algorithmic description; using the design representation to generate an initial hardware design that is an estimate of hardware resources necessary to implement at least some of the specified functionality; and computing power consumption for the initial hardware design based on the activity profile and power models for the hardware resources.

27 Claims, 6 Drawing Sheets

U.S. PATENT DOCUMENTS

| | | | |
|---|---|---|---|
| 6,195,786 | B1 | 2/2001 | Raghunathan et al. |
| 6,493,863 | B1* | 12/2002 | Hamada et al. ............... 716/18 |
| 6,598,209 | B1 | 7/2003 | Sokolov |
| 6,625,797 | B1* | 9/2003 | Edwards et al. ............... 716/18 |
| 2002/0004927 | A1* | 1/2002 | Takahashi et al. .............. 716/2 |

FOREIGN PATENT DOCUMENTS

| | | |
|---|---|---|
| EP | 1 168 206 A2 | 1/2002 |

OTHER PUBLICATIONS

Benini et al., "System-Level Power Optimization: Techniques and Tools", *ACM Transactions on Design Automation of Electronic Systems*, 5(2):115-192 (2000).

Benini et al., "System Level Power Estimation and Optimization" *Proc. International Symposium on Low Power Electronics and Design*, Monterey, Aug. 1998.

Brandolese et al., "A Multi-Level Strategy for Software Power Estimation", *Proc. Int. Symposium on System Synthesis*, Madrid, 2000.

Brooks et al., "Wattch: A Framework for Architectural-Level Power Analysis", *Proc. International Symposium on Computer Architecture*, 2000.

Christie et al., "The Interpretation and Application of Rent's Rule", *IEEE Transactions on VLSI Systems*, 8(6), Dec. 2000.

Ferrandi at al., "Power Estimation of Behavioral Descriptions", *Proc. Design, Automation and Test in Europe (Date)*, Paris, Mar. 1998.

Fomaciari et al., "Power Estimation for Architectural Exploration of HW/SW Communication on System-Level Buses", *Proc. 7th International Workshop on Hardware/Software Codesign (Codes)*, Rome, 1999.

GarciaOrtiz et al. "Moment Based Power Estimation in Very Deep Submicron Technologies" Proc. ACM/IEEE Int. Conf. on Computer Aided Design, San Jose, Nov. 2003.

Gircyzc et al. "An ADA to Standard Cell Hardware Compiler Based on Graph Grammers and Scheduling" Proc. IEEE Int. Cont. on Computer Design, Oct. 1984.

Hedenstiema et al., "CMOS Circuit Speed and Buffer Optimization", *IEEE Transactions on CAD*, 6(3) (1987).

Henkel et al., "Energy-Conscious HW/SW-Partitioning of Embedded Systems: A Case Study on an MPEG-2 Encoder", *Proc. 6th International Workshop on Hardware/Software Codesign (Codes)*, Seattle, 1998.

Henkel, "A Low Power Hardware/Software Partitioning Approach for Core-based Embedded Systems", *Proc. Design Automation Conference*, New Orleans, Jun. 1999.

Hsieh et al., "Profile-Driven Program Synthesis for Evaluation of System Power Dissipation", *Proc. Design Automation Conference*, Anaheim, Jun. 1997.

Khouri et al. "Fast High-level Power Estimation for Control-flow Intensive Designs" Proc. International Symposium on Low Power Electronics and Design, Monetery, Aug. 1998.

Kruse et al. "Estimation of Lower and Upper Bounds on the Power Consumption from Scheduled Data Flow Graphs" IEEE Trans. On Very Large Scale Integration (VLSI) Systems, vol. 9, No. 1, Feb. 2001.

Kumar et al. "Profile-Driven Behavioral Synthesis for Low-Power VLSI Systems" IEEE Design and Test of Computers, No. 3, New York 1995.

Lidsky et al., "Early Power Exploration—A World Wide Web Application", *Proc. Design Automation Conference*, Las Vegas, Jun. 1996.

Liu et al., "HyPE: Hybrid Power Estimation for IP-Based Programmable Systems", *Proc. Design Automation Conference*, Anaheim, Jun. 2003.

Marculescu et al., "Information Theoretic Measures of Energy Consumption at Register Transfer Level", *Proc. International Symposium on Low Power Electronics and Design*, Dana Point, Apr. 1995.

Martin et al., "Power-Profiler: Optimizing ASICs Power Consumption at the Behavioral Level", *Proc. Design Automation Conference*, San Francisco, Jun. 1995.

Mehra et al. "Behavioral Level Power Estimation and Exploration" Proc. First International Workshop on Low Power Design, pp. 197-202, Napa Valley, Apr. 1994.

Müller-Glaser et al., "Estimating Essential Design Characteristics to Support Project Planning for ASIC Design Management", *Proc. Int. Conference on Computer Aided Design*, San Jose, Nov. 1991.

Musoll et al. "Scheduling and Resource Binding for Low Power" Proc. Int. Symposium on System Synthesis, Cannes, Sep. 1995.

Nebel "High-Level Power Estimation and Analysis" Low Power Electronics Design, Oldenburg University, 2004.

Nemani et al., "High-Level Area and Power Estimation for VLSI Circuits", *Proc. Int. Conference on Computer Aided Design*, San Jose, Nov. 1997.

Prabhakaran et al. "Simultaneous Scheduling, Binding and Floorplanning for Interconnect Power Optimization" Proc. VLSI Design, Goa, Jan. 1999.

Raghunathan et al. "Behavioral Synthesis for Low Power" Proc. IEEE Int. Cong. on Computer Design, Oct. 1994.

Rammamoorthy et al., "Recognition and Representation of Parallel Processable Streams in Computer Programs-II", Proc. *ACM/CSR-ER Proceedings of the 1969 24th National Conference*, 1969.

Sarker et al. "Low Power Optimization Techniques in Overlap Add Algorithms" Proc. Int. Conf. on Computer, Communication and Control Technologies: CCCT '03, Orlando, Jul. Aug. 2003.

Schmidt et al. "Automatic Nonlinear Memory Power Modelling" Proc. Design, Automation, and Test in Europe (Date), Munich, Mar. 2001.

Schmidt et al., "Memory Power Models for Multilevel Power Estimation and Optimization", *IEEE Transactions on Very Large Scale Integration Systems*, 10(2) 2002.

Simunic et al., "Cycle-accurate Simulation of Energy Consumption in Embedded Systems", *Proc. Design Automation Conference*, New Orleans, Jun. 1999.

Stammermann et al. "System Level Optimization and Design Space Exploration for Low Power" Proc. Int. Symposium on System Synthesis, Montreal, Sep. 2001.

Stammermann et al. "Binding, Allocation and Floorplanning in Low Power High-Level Synthesis" Proc. ACM/IEEE Int. Conference on Computer Aided Design, San Jose, Nov. 2003.

Stammermann et al. "Interconnect Driven Low Power High-Level Synthesis" Proc. PATMOS, Torino, Sep. 2003.

Tiwari et al., Power Analysis of Embedded Software: A First Step towards Software Power Minimization:, *Proc. Int. Conference on Computer Aided Design*, San Jose, Nov. 1994.

Zhong et al. "Interconnect-aware High-level Synthesis for Low Power" Proc. Conference on Computer Aided Design, San Jose, Nov. 2002.

"Analysis of the Relationship Between EDA Expenditures and Competitive Positioning of IC Vendors: A Custom Study for EDA Consortium" International Business Strategies, Inc., Los Gatos, California. Jan. 2002.

Jochens et al., "Power Macro-Modelling for Firm-Macro", Lecture Notes in Computer Science, vol. 1918, Jan. 2000.

\* cited by examiner ered: about 10 months and the expected design time for next designs to be about 15 months. One can also estimate from this report that an average of 4.7 design iterations is needed to complete a design. One could easily conclude that the NRE costs are not determined by the increasing mask costs but rather by the design costs. One could also conclude that the design community is pessimistic with regard to design efforts for new.

PREDICTABLE DESIGN OF LOW POWER SYSTEMS BY PRE-IMPLEMENTATION ESTIMATION AND OPTIMIZATION

This application claims the benefit of U.S. Provisional Application No. 60/539,448, filed Jan. 27, 2004, incorporated herein by reference.

TECHNICAL FIELD

This invention relates to the design of low power circuits and systems.

BACKGROUND OF THE INVENTION

"Big things always start small"—This wisdom also applies to microelectronic design. And it is at the beginning of the design process, when the complexity is still small and can well be understood under different aspects, that the important decisions are made, which will lead to success or failure. Once a design has been developed to a large structure of logic and wires, it is difficult to cure problems, which in many cases also started small and eventually became large, hard to solve without major design re-spins—costing months of design time, major engineering resources and can be responsible for missed marketing opportunities.

According to [Ref. 1: Jones, H., Analysis of the Relationship between EDA Expenditures and Competitive Positioning of IC Vendors, IDS, 2002.] 85% of all design projects finish late if they finish at all. The same source states that all projects are late by 53% of the originally estimated design time. Gartner/Dataquest reported about the number of designs iterations and the design time. From these data one can estimate the average design time for current designs to be about 10 months and the expected design time for next designs to be about 15 months. One can also estimate from this report that an average of 4.7 design iterations is needed to complete a design. One could easily conclude that the NRE costs are not determined by the increasing mask costs but rather by the design costs. One could also conclude that the design community is pessimistic with regard to design efforts for new.

If one assumes that the average employment cost for a design engineer in high cost regions is about $200k and the additional cost for EDA licenses is about $30k, then about ⅓ of the total design cost (or about $70k per design engineer) is spent due to unexpected design iterations. These are typically due to late detection of design errors or because problems are found at a very late stage of the design process. Even worse, these delays often cause missed market opportunities if competition is able to enter the market earlier and gains large market shares during the most profitable market window. A delay in market entry of six months can result in reduced revenues of up toe 50%. In conclusion, delays and unnecessary design iterations cost the industry tens of billions of dollars each year.

The reasons for the large number of design iterations are manifold: less predictable semiconductor fabrication processes, more aspects to be considered, complexity of the designs. However, there is one common issue among these reasons: the problems are detected too late. Months of tedious design time had already been spent and many CPU-hours of verification had been used to refine the design and verify certain aspects.

SUMMARY OF THE INVENTION

The embodiments presented herein represent a shift towards earlier phases in the power estimation aspects of the design process.

In general, on one aspect, the invention features a method of designing a low power circuit that implements specified functionality. The method includes: analyzing code for an algorithmic description of the specified functionality to generate a design representation of the circuit at the algorithmic level; instrumenting the code for the algorithmic description so as to capture data streams during execution/simulation of the algorithmic description; executing/simulating the instrumented code to generate an activity profile for the algorithmic description, wherein said activity profile includes at least portions of data traces of at least a portion of the executed algorithmic description; using the design representation to generate an initial hardware design that is an estimate of hardware resources necessary to implement at least some of the specified functionality; and computing power consumption for the initial hardware design based on the activity profile and power models for the hardware resources.

Other embodiments include one or more of the following features. The activity profile includes a complete data trace of at least a portion of the executed algorithmic description or it includes samples of a data trace of at least a portion of the executed algorithmic description. The generated initial hardware design is an estimate of hardware resources necessary to implement all of the specified functionality. The method also includes, based on the activity profile and the initial hardware design, iteratively modifying a derived hardware design to arrive at a final hardware design that is optimized for low power, wherein iteratively modifying involves using the activity profile to compute a power consumption estimation for the derived hardware design at multiple iterations of the design. Iteratively modifying involves using the activity profile to compute a power consumption estimation for the derived hardware design at each iteration of the design. Iteratively modifying involves using the activity profile and power models for the hardware resources to compute a power consumption estimation for the derived hardware design at each iteration of the design. The design representation is a control data flow graph. Using the design representation to generate the initial hardware design involves using the design representation to allocate and schedule operations of the algorithmic description among the hardware resources. The algorithmic description does not carry implementation-related information. The activity profile is generated without reference to a hardware description. The activity profile contains (1) information about the sequence of an execution of statements of the algorithmic description; and (2) information about data processed by those statements. The initial hardware design includes a schedule, a set of allocated resources, an initial binding, and a floorplan. The method also includes outputting the final hardware design that is optimized for low power.

In general, in another aspect, the invention features a system for designing a low power circuit that implements specified functionality, The system includes: a processor system; and a storage system storing: (1) an activity estimator module programmed to cause the processor system to: analyze code for an algorithmic description of the specified functionality to generate a design representation of the circuit at the algorithmic level; automatically instrument the code for the algorithmic description so as to capture data streams during execution of the algorithmic description; and execute the instrumented code to generate an activity profile for the algorithmic description, wherein said activity profile includes data traces of at least a portion of the executed algorithm; (2) an architecture estimator module programmed to cause the processor system to use the design representation and a target architecture template to generate an initial hardware design that is an estimate of hardware resources necessary to implement the specified functionality; and (3) a power estimator module programmed to cause the processor system to compute power consumption for the initial hardware design based on the activity profile and power models for the hardware resources.

Other embodiments include one or more of the following features. The architecture estimator and the power estimator modules are programmed to cause the processor system to, based on the activity profile and the initial hardware design, iteratively modify a derived hardware design to arrive at a final hardware design that is optimized for low power, wherein iteratively modifying involves using the activity profile to compute a power consumption estimation for the derived hardware design at multiple iterations of the design.

In general, in still another aspect, the invention features a method of computing power consumption of a circuit design for implementing specified functionality. The method involves: performing an untimed algorithmic simulation to generate simulation data for an algorithmic description that implements the specified functionality; designing a predicted circuit architecture for implementing the specified functionality, the predicted architecture including a plurality of hardware functional units; time stamping the simulation data to indicate when the simulation data would have been produced if the predicted architecture had been simulated instead of the algorithmic description; and computing power consumption of the predicted architecture based on power models for the plurality of hardware functional units and the time-stamped simulation data.

Other embodiments include one or more of the following features. The method also involves, from the time-stamped simulation data, deriving timed vector lists identifying data that would be visible at inputs of the plurality of hardware functional units, wherein computing power consumption is based on the timed vector lists. The method further involves generating a design representation for the algorithmic description, and wherein time stamping the simulation data involves combining the design representation with the predicted architecture.

The details of one or more embodiments of the invention are set forth in the accompanying drawings and the description below. Other features, objects, and advantages of the invention will be apparent from the description and drawings, and from the claims.

DETAILED DESCRIPTION

Analysis vs. Estimation

Figure 1:
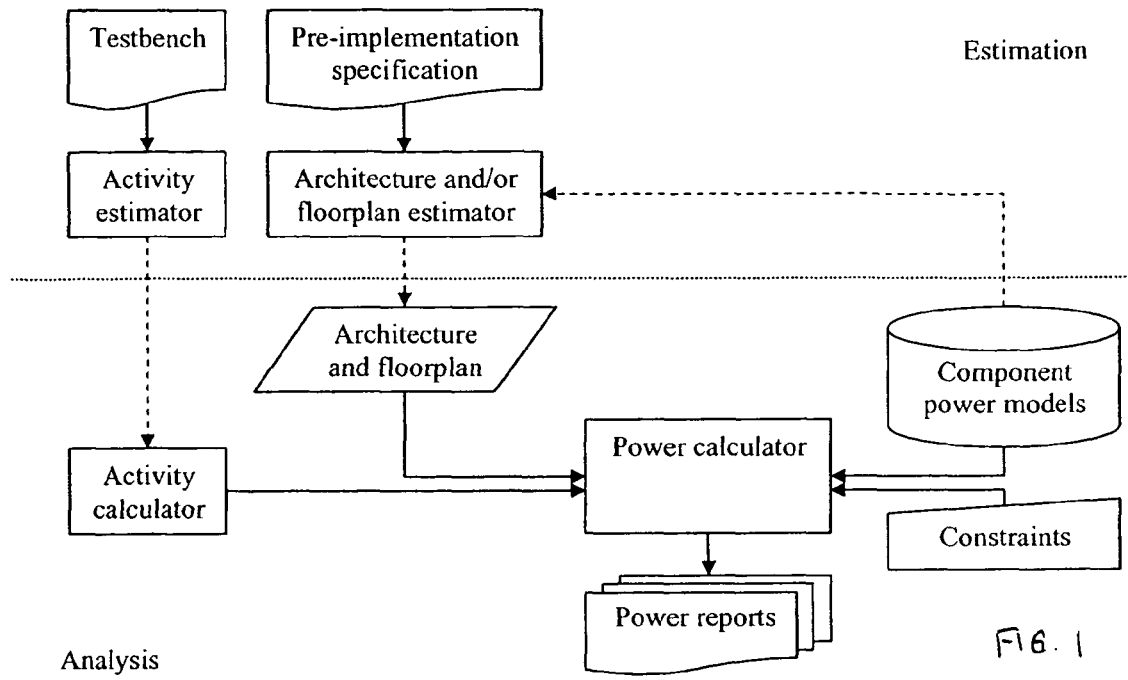
FIG. 1 is a block diagram of a generic power analysis and estimation flow.

It is useful first to clarify two concepts, namely, "estimation" and "analysis." Analysis is based on an existing design at any level, i.e. the structure is given, typically in terms of a netlist of components. These modules are predesigned and for each one a power model exists. These power models can be evaluated based on the activation of the modules. Hence, power analysis is the task of evaluating the power consumption of an existing design at any level. It is used to verify that a design meets its power and reliability constraints, e.g. no electromigration occurs, no hot spots will burn the device, and no voltage drops will cause spurious timing violations. Power analysis finally helps to select the most cost efficient chip package.

In contrast, estimation builds on incomplete information about the structure of the design or part of the design under consideration. The design does not yet exist and can only be generated based on assumptions about the later physical implementation of the design, its modules, its interconnect structure, and physical layout. In summary: estimation requires design prediction followed by analysis. For example, if the floorplan of a design is not yet available, interconnect power estimation first requires a floorplan prediction. Power estimation is applied to assess the impact of design decisions and compare different design alternatives on incomplete design data. It allows to efficiently exploring the design space without the need for a detailed implementation of all different design options.

Sources of Power Consumption

The basis for high-level power analysis is the physical basics of power consumption. There are three general forms of power consumption, namely, switched capacitance power, short circuit power, and leakage power. Today, the switched capacitance power consumption still dominates. One can safely assume that the power consumption of computation intensive devices at 70 nm and larger technology nodes will be dominated by the dynamic power consumption.

Switched Capacity Power

Eq. 1 enables one to calculate the power consumption of a switched capacitor. At the transistor-level, $C_{load}$ includes the parasitic gate overlap and fringing capacitances as well as the Miller capacitance. The $\alpha$ parameter models the switching probability of the transistor during a cycle of the clock toggling at frequency f. $V_{dd}$ is the supply voltage. As will be shown shortly, applying this formula at higher levels of abstraction requires a revised interpretation of some of these parameters.

$$P_{swcap} = \frac{1}{2} C_{load} \cdot \alpha \cdot V_{dd}^2 \cdot f \qquad \text{Eq. 1}$$

Eq. 1 holds for unnecessary transitions (e.g. glitches), while it needs refinement for modeling a sequence of n incomplete transitions within a period of T and with a voltage swing of $\Delta V_n$. See the refined Eq. 2:

$$P_{incompleteswcap} = \frac{1}{2T} \cdot C_{load} \cdot V_{dd} \cdot \sum_{i=1}^{n} \Delta V_n \qquad \text{Eq. 2}$$

Short Circuit Power

Short circuit power is the second part of the dynamic power consumption. It occurs when during a short period both the pull-up and the pull-down networks of static CMOS-gates are conducting. Eq. 3 gives a simple model of the short circuit power with $\beta$ modeling the transistors' conductivity per voltage factoring the linear region, T the inputs' rise/fall time and $\tau$ the gate delay.

$$P_{shortcircuit} = \frac{\beta}{12}(V_{dd} - 2V_{th})^3 \frac{\tau}{T} \qquad \text{Eq. 3}$$

Eq. 3 is an overestimation by up to a factor of 3. For an accurate analysis, transistor level models and transient analyses are needed [Ref. 2: Hedenstierna, N., and Jeppson, K., CMOS Circuit Speed and Buffer Optimization, *IEEE Transactions on CAD*, Vol. 6, No. 3, 1987]. However, $P_{shortcircuit}$ within modules can be captured as part of the dynamic power models of the modules.

Leakage

The leakage power consumption is mostly due to leakage currents flowing through the channel in weak inversion even when the gate-source voltage is below threshold. The leakage power depends on the state of the circuit. Analysis, modeling and optimization of the leakage power are currently subject of intensive research.

Generic Power Estimation and Analysis Flow

In general, any analysis tool for the dynamic power consumption needs to evaluate Eqs. 1 and 2. This can be done at different degrees of abstraction, e.g. for high level power analysis, the entire dynamic power consumption of a module will be described by a single power model rather than by all individual capacitances inside the module. Similarly the switching probability of all capacitances is lumped together into an activity model for the module. FIG. 1 shows a generic power estimation and analysis flow that can be applied at any level of abstraction. (The modules shown in FIG. 1 will be described in greater detail later when this power estimation and analysis flow is specified for the algorithmic-level power estimation and analysis.

The upper part of FIG. 1 is applied when a pre-implementation power estimate is needed. In this case, the architecture of the design is unknown yet and the set of components to be allocated to implement the device is still to be determined. Consequently, neither their interconnection and communication structure nor their activation patterns are defined. Hence, an evaluation of Eqs. 1 and 2 is not possible yet, even if higher-level capacitance and activation models were to be applied. It is the task of the architecture and the floorplan estimators to predict the component allocations, their physical floorplan, which is needed for the estimation of the interconnect and clock tree, and the scheduling of the operations, which again is needed to predict the activation of the components. These estimation techniques will be discussed in more detail in the later section relating to algorithmic-level power estimation for hardware implementations.

Once this is done, the kind of information is adequate for a power analysis of this predicted architecture. The relevance of the results of the following power analysis step, however, strongly depends on the quality of the predicted architecture.

The lower part of FIG. 1 depicts the generic power analysis flow. The power calculator basically collects the parameters of Eq. 1 at the respective level of abstraction. The floorplan and the architecture of modules, each having a power model attached, determine the physical and structural architecture and represent the load capacitance $C_{load}$ of Eq. 1—maybe at an abstract level. The activity calculator produces an activation profile for each of the components modeling the switching probability $\alpha$ of Eq. 1. Finally, the supply voltage $V_{dd}$ and the clock frequency f are part of the constraints provided by the designer.

In general, power analysis at any level requires three main input models, namely, an architecture model, component models, and an activation model.

Low Power Design Flow

Figure 2:
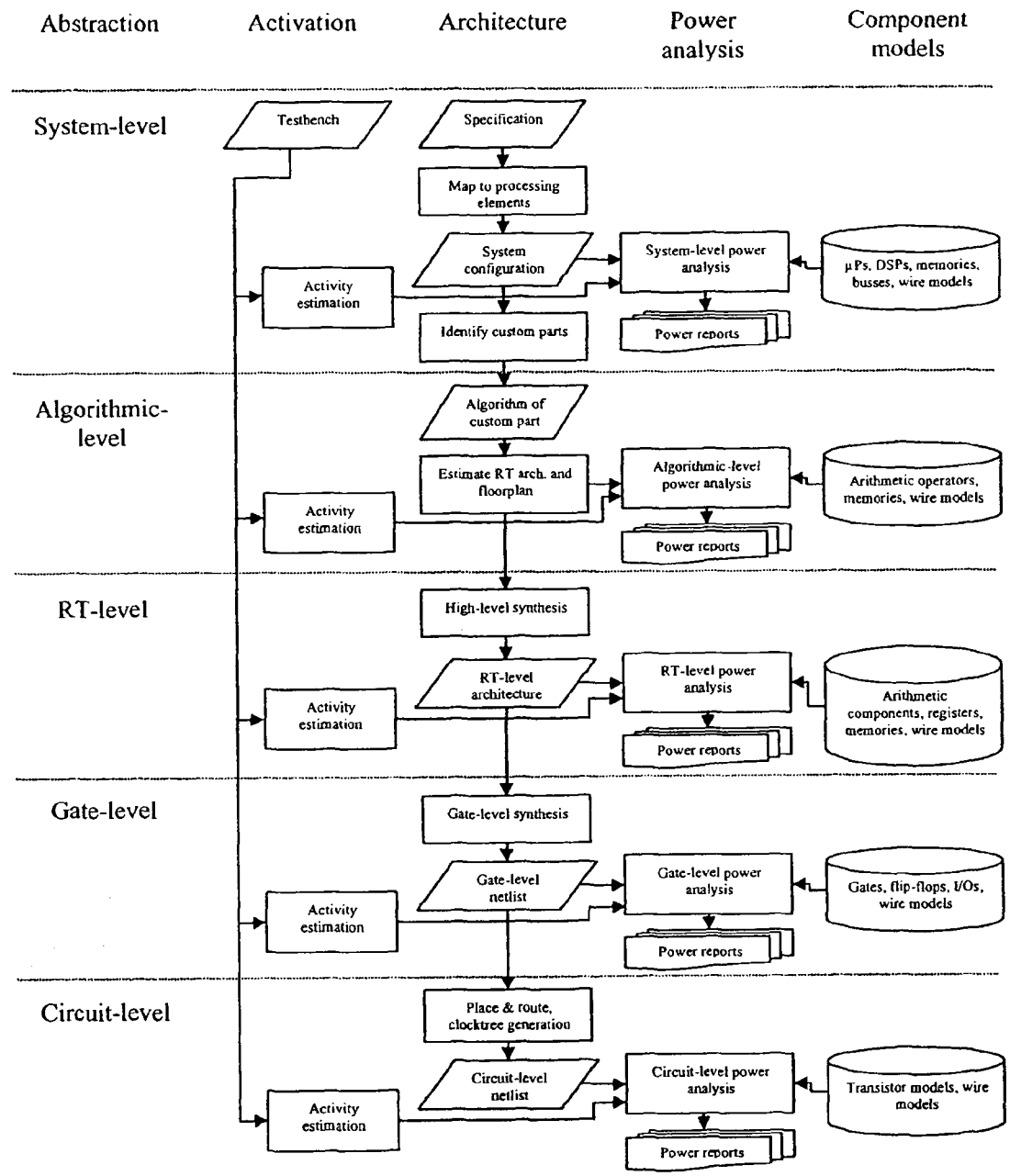
FIG. 2 shows a generic low power design flow.

FIG. 2 shows a generic power conscious design flow, which, however, is also applicable to platform based design and incremental designs.

At the system-level the design objective is to map a given—possibly informal—specification onto a target architecture. In many cases, this architecture will be constrained to a platform consisting of fixed architecture elements like, e.g. processors, micro-controllers, DSPs and a bus standard. The design objective is to find an optimized mapping, which meets functional and performance constraints at least cost and power consumption. A system-level power management can be included at this level and needs to be considered during power analysis. The most frequently used tool at this level is a spreadsheet program.

The largest reduction in power consumption can most likely be gained by implementing the most computation intensive parts of the system by application specific logic. Due to the custom character of this part, no predefined module exists. Its functionality is best defined by an executable model, e.g. an algorithm written in a programming or a hardware description language. Since no architecture model exists yet, this has to be predicted together with an interconnect and clock tree model. Based on this estimated design combined with real power models for the allocated predefined components, a power analysis can be performed.

The lower levels of design follow by consecutively generating more detailed design descriptions by a sequence of synthesis steps, refining the testbench by including bitwidth, data encoding and delay information and by providing the respective lower level power models. The design objectives at these levels include further local optimizations of the same cost function already applied in a more abstract form at the higher levels of abstraction. A variety of commercial tools are available to aid in this process.

System-Level Power Analysis

A system consists of a set of components, which jointly perform a common task. Definitions like this one describe the essence of system-level design: allocation of components, partitioning of the system's task onto these sub-systems, and organization of the co-operation of the components.

Objective of System-Level Design

System-level design starts from a specification, some environmental constraints, and possibly a restriction of the design space. The specification can be given informally and in this case requires formalization. A well-established formalism is a task graph [Ref. 7: Rammamoorthy, C. V., and Gonzalez, M.

Figure 3:
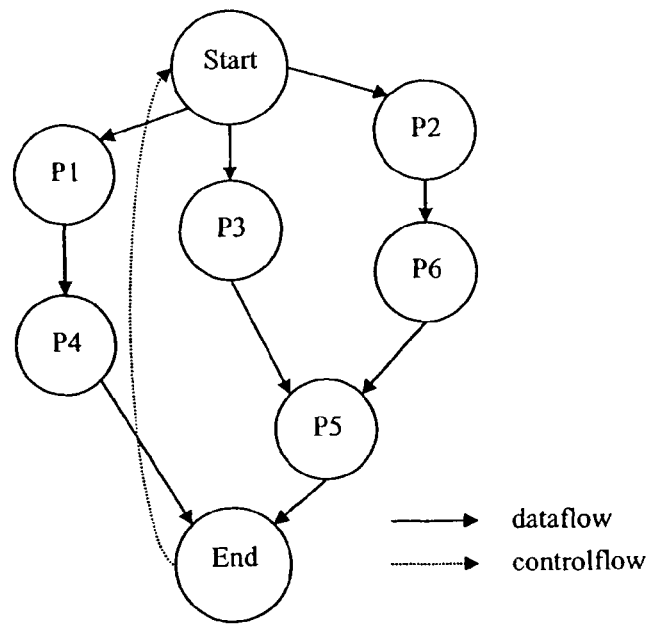
FIG. 3 is an example of a task graph.

J., Recognition and Representation of Parallel Processable Streams in Computer Programs-II, in Proc. *ACM/CSR-ER Proceedings of the* 1969 24$^{th}$ *National Conference,* 1969.]. A task graph is a representation of a task showing the sub-tasks (processes) and their data as well as control flow dependencies. It consists of vertices representing the sub-tasks and edges representing the data flow and control flow dependencies. A task graph is a system specification exhibiting parallelism and concurrency. FIG. 3 shows an example of a task graph. While the Start-vertex and the End-vertex are needed to model the synchronous beginning and termination of each execution loop of the task, the other vertices represent the processes P1 to P6 of the task. The solid edges represent data dependencies, which are important to exploit resource sharing. For example, P6 is data dependent on the results of P2. Hence, P6 cannot be executed in parallel to P2, i.e., they can share resources. On the other hand, P3 and P2 are concurrent processes, i.e. it is up to the designer's choice whether he allows resource sharing between these processes or not. The dotted edges model the control flow. In the example of FIG. 3, the edge between End and Start specify that this task will be executed in a loop.

The environmental constraints typically include minimum performance requirements, maximum cost and power constraints, as well as some form factors and I/O loads.

Figure 4:
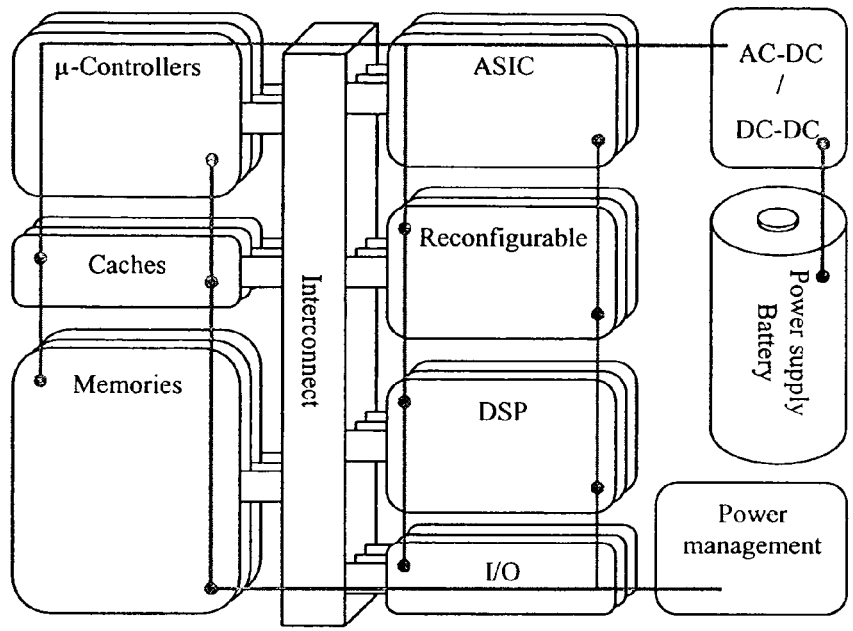
FIG. 4 is an example of a system-level architecture.

Finally, the third input can be a restriction of the design space, e.g. by requesting to use a given set of processors, DSPs, memories, and bus structures. These together with the respective software infrastructure make a platform. FIG. 4 shows a generic system-level architecture, which could be a platform or an existing design. It is the objective of the system-level designer, the so called system-architect, to allocate a set of components, map each processes of the task graph onto exactly one component (frequently called: processing element) and define the necessary control and communication structure to implement the task graph. The optimization criterion is to achieve an architecture within the given design space, which meets all performance constraints and is an optimal trade-off between cost and power consumption. Note that, at this level the basic structures of a power management policy need to be defined.

A straightforward way for power and performance optimization is to identify so-called "computational kernels" [Ref. 8: Henkel, J., A Low Power Hardware/Software Partitioning Approach for Core-based Embedded Systems, in *Proc. Design Automation Conference*, New Orleans, June 1999.]. These are the inner loops of computation intensive processes. Implementing them by application specific hardware will not only increase the performance and allow using a less expensive processor, but also reduce the power consumption because of the optimized datapath and hard-wired control. However, although such a decision may be obvious, it requires a detailed understanding of the implications. For example, the communication between the processor and the application specific hardware needs to be considered. The memory architecture may become more complicated and require multi-port memories. Hence, an adequate tool support is needed to enable sound decisions. An excellent overview of the optimization techniques at this level can be found in [Ref. 9: Benini, L., and de Micheli, G., System-Level Power Optimization: Techniques and Tools, *ACM Transactions on Design Automation of Electronic Systems, Vol.* 5, No. 2, 115-192, 2000.].

Analysis of an Implementation Model

A frequent design scenario is a platform based design flow. In this case the designers have to use a given Hardware/Software (HW/SW) platform to implement the specification. In many cases, an executable model of the system does not yet exist. However, experience with previous systems on the same platform is available. The power estimation can only be based on the general application know-how of the design team, existing power data of the architecture and its components, assumptions about application specific logic and an intended mapping of the processes of the task onto the various processing elements of the platform such as processors, DSPs, application specific logic, or memories.

The frequently used straight forward spreadsheet approach of power estimation is based on collecting power related information from data sheets, semiconductor vendors, the application, and experience in a spreadsheet, which implements a power model of the entire system. Often the experience or data are not yet available for the intended target semiconductor technology of the new design, but only for previous technologies. In these cases technology-scaling models need to be applied to estimate the power consumption of a module to be processed in a new technology from data of a recent one.

The sources of the power figures for the spreadsheet depend on the kind of the module under consideration. For processors and DSPs, power figures are available from the datasheets of the processor vendors. At this level, power data given by the vendors are typically not detailed to the instruction level or even data dependent, but a single figure in terms of power per Megahertz for the processor working at a given supply voltage. Similarly, power data for embedded memories need to be collected from the memory provider or semiconductor vendor.

The interfaces of the design are typically well defined at this level. The system specification should exactly name the I/Os of the system and their required load. The data sheets of the semiconductor vendor offer detailed power figures for these cells.

So far, the power model is an analysis one. Even with rough power models of the components, there was no need to make assumptions about the system architecture. Estimation starts with the consideration of application specific logic. This part may only consume a small fraction of the entire power of the system, but it is the key to reduce the processor power and possibly downgrade the processor to a less expensive and less power-consuming version. At this stage little is known about the application specific logic. At best an algorithmic description of this part is available, which can be used for algorithmic-level power estimation (to be discussed in a later section). If such an algorithm does not yet exist, power estimation is based on the experience of the designer who can predict the number of gates and registers most likely needed to implement the required function within the given performance constraints. Application knowledge can help to estimate the expected activity of such a module. ASIC vendors can provide average power figures for logic in a given technology based on their experience and characterizations. This figure will come in terms of Milliwatts per Megahertz per kilogate and needs to be weighted with an activity ratio expected for the application. The number of registers can be a useful input to an estimate of the clock tree power.

A refined approach to this principle has been developed as the web-based tool PowerPlay [Ref. 10: Lidsky, D., and Rabaey, J. M., Early Power Exploration—A World Wide Web Application, in *Proc. Design Automation Conference*, Las Vegas, June 1996.]. Another concept at this level is the power state machine [Ref. 11: Benini, L., Hodgson, R., and Siegel, P., System Level Power Estimation and Optimization, in *Proc. International Symposium on Low Power Electronics* and *Design*, Monterey, August 1998.], which includes a dynamic model of the activation and deactivation of the various system components. It is well suited for evaluating and optimizing power management policies.

Given the rough granularity of the power models used to create a spreadsheet System-level power model, this can be useful to support a first check whether power constraints of the system will be met or not. It can be used to analyze the impact of moving the design to a new technology node or replacing a processor by another one. However, even these conclusions from the model have to be drawn carefully, because many important parameters could not yet be captured. These include the communication power consumed by the data transfers between processors, memories, application specific logic, and I/Os. The clock network, which may consume a considerable part of the total power, is not yet designed. Issues like cross coupling and the second order effects of the scaling theory are out of the scope of such a model. Finally, neither the impact of the software structure nor of the data has been considered.

Analysis of an Execution Model

A more accurate power analysis at the System-level is possible once executable models of the system processes to be implemented exist. An executable model can have the form of a program written in a programming language, e.g. C or C++, a hardware description language, e.g. VHDL or Verilog, or a System-level language like SystemC. (Note that for some of the possible languages that might be used, the model might more appropriately be called a simulation model which will be run as a simulation, as compared an execution model that is executed.) Alternatively, a heterogeneous model, combining several languages and models of computation into a single framework, can model the system. In processor design, the system model also can be an executable performance model. By executing any of these models, an understanding of the dynamic behavior of the system can be achieved. This allows a more detailed power analysis under consideration of the real activity in the system. Still power models of the various components of the system must be at hand, which can be combined with the system architecture and the component activation patterns to a power analysis as shown in FIGS. 1 and 2. The components of a System-level design include: software, memories, and other existing or yet to be designed modules.

Software implementing algorithms and running on predefined and power-characterized cores are discussed later in connection with the algorithmic-level power analysis. If the processor itself is still to be developed and optimized, a more detailed bus functional model of the processor execution is needed. Besides functional models, this includes activation models of the processor components, e.g. the issue queue, the branch prediction unit, the execution units, the cache, the register file. During a simulation of this model the various components are activated and this activity information is captured. It can be used to evaluate the power models of the components and provide a power analysis of the intended processor architecture [Ref. 12: Brooks, D., Tiwar, V., and Martonosi, M., Wattch: A Framework for Architectural-Level Power Analysis, in *Proc. International Symposium on Computer Architecture*, 2000.]. In case of multipurpose modules controlled by control signals, different power models are required associate to each of the operation modes. Their runtime percentages can be used to calculate the total module power consumption [Ref. 13: Liu, X., and Papefthymiou, M. C., HyPE: Hybrid Power Estimation for IP-Based Programmable Systems, in *Proc. Design Automation Conference*, Anaheim, June 2003.].

Memories may consume a considerable percentage of the total power consumption. Consequently, they offer a large power reduction potential. Research has proposed a number of methodologies for memory power optimization. The probably most holistic methodology, called DTSE, has been developed by Catthoor et al. [Ref. 14: Catthoor, F., *Custom Memory Management Methodology: Exploration of Memory Organisation for Embedded Multimedia System Design*, Boston: Kluwer, Acad. Publ., 1998.]. Arguing that memory power is the dominating part of the system power consumption in signal processing applications, they advocate to perform a memory power optimization before any other power optimizations. The key idea is to apply a sequence of optimizations on the specifications, which—partly automated—perform global loop and control-flow transformations, a data-reuse analysis, a storage cycle distribution, memory allocation and assignment, and finally an in-place optimization. The objective is to increase data locality, avoid memory access and design an optimized memory hierarchy. The result is a synthesizable system and memory description.

To assess the power consumption regardless of the optimization methodology requires power models of the various memory types. Power models for memories are difficult to create. They shall be flexible and parameterized at least with respect to their size, they shall be accurate, and they shall be generated efficiently. The task of characterization of a parameterized memory power model requires a simulation of different instances of the memory. Consequently, simulation models need to be available. Due to the flat structural hierarchy of memories, typically only transistor level models are available. They cause a prohibitive simulation time when executed for memories of practical size. Hence, abstractions have to be used in memory power modeling. These abstractions can be used to model parts of the memory cell array, in particular its capacitive load. However, this abstraction requires access to the internal data of the memory, which is sensitive proprietary information of the memory vendor. To overcome the confidentiality issue, the power model itself should not disclose any information about the internal structure of the memory. Hence, functional power models are adequate, which can be generated using regression techniques. An approach by Schmidt et al. [Ref. 15: Schmidt, E., von Cölln, G., Kruse, L., Theeuwen, F., and Nebel, W., Memory Power Models for Multilevel Power Estimation and Optimization, *IEEE Transactions on Very Large Scale Integration Systems*, Vol. 10, No. 2, 2002.] includes non-linear terms in the regression, which are needed to accurately model e.g. the address decoder, a logarithmic structure.

For other (non-software) components, the activation has to be captured from the executable system model and mapped to a state dependent power macro model. If application specific logic, e.g. a block of standard or reconfigurable cells, is to be part of the architecture, this is not yet power characterized. The executable model in this case is a pure functional model, e.g. an algorithm, and the problem of power estimation is the same as discussed with the spreadsheet approach. It requires architecture estimation.

Due to long wires and heavily loaded system busses, interconnect power can exhibit a significant percentage of the system power. Analyzing the power consumption of interconnect requires input of physical layout and material properties. This can be partly available for a platform based on measurements or simulations. Off-chip interconnect capacitive loads which can easily be several orders of magnitude larger than on-chip loads, can be derived from the system specification. The power analysis becomes more difficult for on-chip interconnect and in case of complex bus encoding schemes.

Complex bus encoding schemes have been proven to allow a significant reduction of the switched capacitance of busses, e.g. [Ref. 16: Formaciari, W., Sciuto, D., and Silvano, C., Power Estimation for Architectural Exploration of HW/SW Communication on System-Level Buses, in *Proc. 7th International Workshop on Hardware/Software Codesign (CODES)*, Rome, 1999.] report a 48% reduction in address busses with Gray-Code. Since bus encoding is defined at this level, the impact on the power consumption needs to be taken into account including the overhead for the encoders and decoders.

Similarly, power management needs to be included in system-level power estimation. Its optimization is part of the system-level design. It requires models for the power management policies under consideration as well as for the shut down and wake-up power penalty. The power management policies can be integrated into the execution model of the system or they can be modeled by a power state-machine [Ref. 11]. Similarly, dynamic power management techniques, which are typically implemented in software or the operating system (RTOS), require respective models of the policy [Ref. 9].

Algorithmic-level Power Estimation and Analysis

The design tasks at the algorithmic-level of abstraction include optimizing algorithms, which are to be implemented either by software, application specific hardware, or by a combination of both. The objectives include performance, cost and power optimizations. Means of improvements include selection of the most suitable algorithm performing the requested function, optimizing this algorithm, and partitioning the algorithm into parts, which will finally be implemented in software, and others, which will be realized by hardware.

Selecting the most power efficient algorithm out of a repertoire of available and functionally equivalent ones requires an estimate of the to-be-expected power consumption of an implementation of the different algorithms. Of course, the comparison must be based on power efficient realizations of these algorithms without the need to really implement them.

Once an algorithm has been chosen, it can be optimized for low power. First the control flow can be optimized to reduce the number of control statements, e.g. by different kinds of loop unrolling strategies. Additionally, these transformations extend the scope of local statement reordering and pave the way to local memory access optimizations. An example of a sequence of such optimizations is presented in [Ref. 17: Sarker, B., Nebel, W., and Schulte, M., Low Power Optimization Techniques in Overlap Add Algorithmus, in *Proc. Int. Conf on Computer, Communication and Control Technologies*: CCCT'03, Orlando, July, August, 2003.]. The data of the algorithms is typically specified in terms of floating-point variables and arrays. For a hardware implementation a more efficient data representation is possible, e.g. fixed-point data types of adequate precision for the intended application. Algorithmic-level power estimation is applied to evaluate the impact of the mentioned algorithmic transformations and design decisions [Ref. 18: Stammermann, A., Kruse, L., Nebel, W., Pratsch, A., Schmidt, E., Schulte, M., and Schulz, A., System Level Optimization and Design Space Exploration for Low Power, in *Proc. Int. Symposium on System Synthesis*, Montreal, September, 2001.].

These optimizations, however, have to be made under consideration of the target hardware. Moving the computational kernels of the algorithms to power optimized application specific hardware is the most promising path to the largest gain in power consumption. The reasons are simple: the application specific hardware has a hard-wired controller and no need for consecutive control steps to perform a single instruction. No memory access is needed to find out what to do next. The data path just contains the minimum amount of hardware to perform the operation and last but not least, concurrency can be exploited to a much larger degree than this is possible on a processor core. All this avoids wasting energy [Ref. 19: Henkel, J., and Li, Y., Energy-Conscious HW/SW—Partitioning of Embedded Systems: A Case Study on an MPEG-2 Encoder, in *Proc. 6th International Workshop on Hardware/Software Codesign (CODES)*, Seattle, 1998.]. Hence, hardware/software partitioning is another important design step, which requires algorithmic-level power estimation to support a trade-off analysis between application specific hardware implementations of parts of the design vs. software implementations. Due to the different nature of software and hardware, dedicated tools are needed for software power analysis and algorithmic-level power estimation for hardware implementations.

Design input at the algorithmic-level is an algorithmic description, typically executable, or a functional model describing the input/output relation, and a set of constraints. It is important to note, that the algorithm is not yet meant as an implementation, but just as a prototype, which needs optimization and implementation.

The algorithm can formally be represented by a Control and Data Flow Graph (CDFG) [Ref. 21: Girczyc, E. F., and Knight, J. P., An ADA to Standard Cell Hardware Compiler Based on Graph Grammers and Scheduling, in *Proc. IEEE Int. Conf. on Computer Design*, October, 1984.], [Ref. 22: Raghunathan, A., and Jha, N. K., Behavioral Synthesis for Low Power, in *Proc. IEEE Int. Conf. on Computer Design*, October, 1994.]. The vertices of the CDFG represent either the arithmetic or logic statements of the algorithm, or the control statements. The edges model the data and control flow dependencies. A CDFG implies a partial order on the execution of the statements as required by the data and control dependencies of the algorithm.

The output of the Algorithmic-level design phase is an implementable algorithm that can be compiled to the target architecture by a software compiler in case the target is software implementation, or an architectural synthesis tool in case of a custom hardware.

Software Power Analysis

Software power analysis is applied to processes to be implemented as software on embedded processors, which can be μ-controllers or DSPs. Software power analysis can be performed at three different levels of granularity: the source-code-level, the instruction-level, and the functional-bus-model-level. They are all based on power models of the target processor and an execution of the software to capture the dynamic behavior. The execution can be performed on the target processor, on another processor, or on a simulator. At any of these levels the power analysis can be used to compare different programs, to select processors, and to optimize the software. The different levels offer a trade-off in accuracy versus effort to generate the power reports.

The source-code-level, which is the highest abstraction level, provides the fastest turn around times for software power estimation because it avoids the generation of the machine code for the target machine. Sciuto et al. [Ref. 23: Brandolese, C., Formaciari, W., Pomante, L., Salice, F., and Sciuto, D., A Multi-Level Strategy for Software Power Estimation, in *Proc. Int. Symposium on System Synthesis*, Madrid, 2000.] have shown that the execution time of a program on a given processor can be used as a measure of its power consumption. Following this idea, the problem of source-code-level power analysis can be reduced to the estimation of the number of execution cycles. This number can be estimated by mapping the source code on instruction classes, which have been empirically characterized with respect to the instructions per cycle of each class. The total energy $E_{program}$, needed for the execution of a program, can thus be estimated using Eq. 4 with $T_{execution}$ being the total execution time of the program and $E_{proc}$ the energy per Megahertz clock frequency of the processor. The accuracy of the approach is within 20% of an instruction level power analysis.

$$E_{program}=T_{execution} \cdot E_{proc} \cdot f \qquad \text{Eq. 4}$$

A higher accuracy can be achieved by working on the instruction set for which code is generated. Power estimation at this level was pioneered by Tiwaki et al. who measured the power consumption of individual instructions and the effects of inter-instruction dependencies [Ref. 24: Tiwari, V., Malik, S., and Wolfe, A., Power Analysis of Embedded Software: A First Step towards Software Power Minimization, in *Proc. Int. Conference on Computer Aided Design*, San Jose, November 1994.]. The measurements can be performed by running long loops of the same instruction or sequence of instructions and physically measuring the power consumed by the processor. Through these measurements a power figure for each pair of consecutively executed instructions can be obtained. A power analysis can thus be performed by capturing the sequence of instructions being executed and combining this information with the instruction level power model. It has been observed, that an abstraction of the large number of different instructions and their addressing modes is possible by clustering the instructions into classes of similar power behavior. It has further been observed [Ref. 23], that the relative power consumption of instructions of different classes is similar for different processors. This significantly simplifies the task of power characterization of a large set of processors.

Software power analysis at the levels mentioned so far is limited in accuracy because many aspects of the program execution cannot be considered. These aspects become an increasing importance with the deployment of more complex embedded μ-controllers and hierarchical memory architectures for systems on chip, e.g. pipelined RISC processors, multi-threaded CPUs, out-of-order execution and embedded caches. Ideally the processor power models should include the complex relationships between issue queue, execution unit, multiple threads, speculative execution, data dependencies, and cache hit- and miss-rates. Accurately analyzing the power consumption of such architectures requires a profiling of the software on an instruction set simulator with access to the system bus. Such a model has e.g. been developed for the ARM processor [Ref. 25: Simunic, T., Benini, L., and de Micheli, G., Cycle-accurate Simulation of Energy Consumption in Embedded Systems, in *Proc. Design Automation Conference*, New Orleans, June 1999.] with an accuracy of 5%. Consideration of these architectural aspects during power analysis allows optimizing either the program for a given processor or the processor configuration for a given program. For example, Simunic et al. [Ref. 25] could achieve a power reduction of more than 50% by replacing an L2 cache by a burst SDRAM while even improving the throughput of a signal processing system. The disadvantage of working at this low level is the long execution time of the simulation. Generating synthetic programs, showing the same performance and power consumption as the original program, but with fewer executed instructions, can speed-up the analysis by several orders of magnitude [Ref. 26: Hsieh, C.-T., Pedram, M., Mehta, G., and Rastgar, F., Profile-Driven Program Synthesis for Evaluation of System Power Dissipation, in *Proc. Design Automation Conference*, Anaheim, June, 1997.].

Algorithmic-Level Power Estimation for Hardware Implementations

Implementing an algorithm or part of it in application specific hardware can significantly reduce the power consumption and relieve the processor from computation intensive task. This may allow downgrading the processor to a cheaper and less power consuming type. The challenge of power estimation at this level, however, is different from the software power analysis problem. The main difference is that the target hardware is not designed yet. The building blocks of that hardware are not yet allocated; the control and data communication between these components is yet to be defined. Hence, before being able to predict the power consumption, it is necessary to estimate the target architecture. The challenge of algorithmic-level power estimation for hardware implementations is thus: given the CDFG of an algorithm, predict the power expected to be consumed by a power optimized custom hardware implementation of this algorithm. That is, predictions of the target architecture and the activation of the components of the architecture are needed as well as the prediction of the communication and storage. At the algorithmic-level, Eq. 1 is replaced by Eq. 5 [see, Ref. 27: Mehra, R., and Rabaey, J., Behavioral Level Power Estimation and Exploration, in *Proc. First Int. Workshop on Low Power Design*, Napa Valley, April, 1994.]:

$$P_{dynamic}=N_a \cdot C_{avg} \cdot V^2 \cdot f_{comp} \qquad \text{Eq. 5}$$

$N_a$ is number of activations of the respective module per computation iteration (per sample), $C_{avg}$ is the average switched capacitance of the module per activation, V the supply voltage of the component, and $f_{comp}$ is the iteration (sampling) frequency of the algorithm. The number of modules and their activation strongly depends on the scheduling, allocation and binding, which have not yet been performed at the algorithmic-level. To evaluate Eq. 5, assumptions about the scheduling, the allocation and binding as well as the interconnect and storage architecture have to be made.

Figure 5:
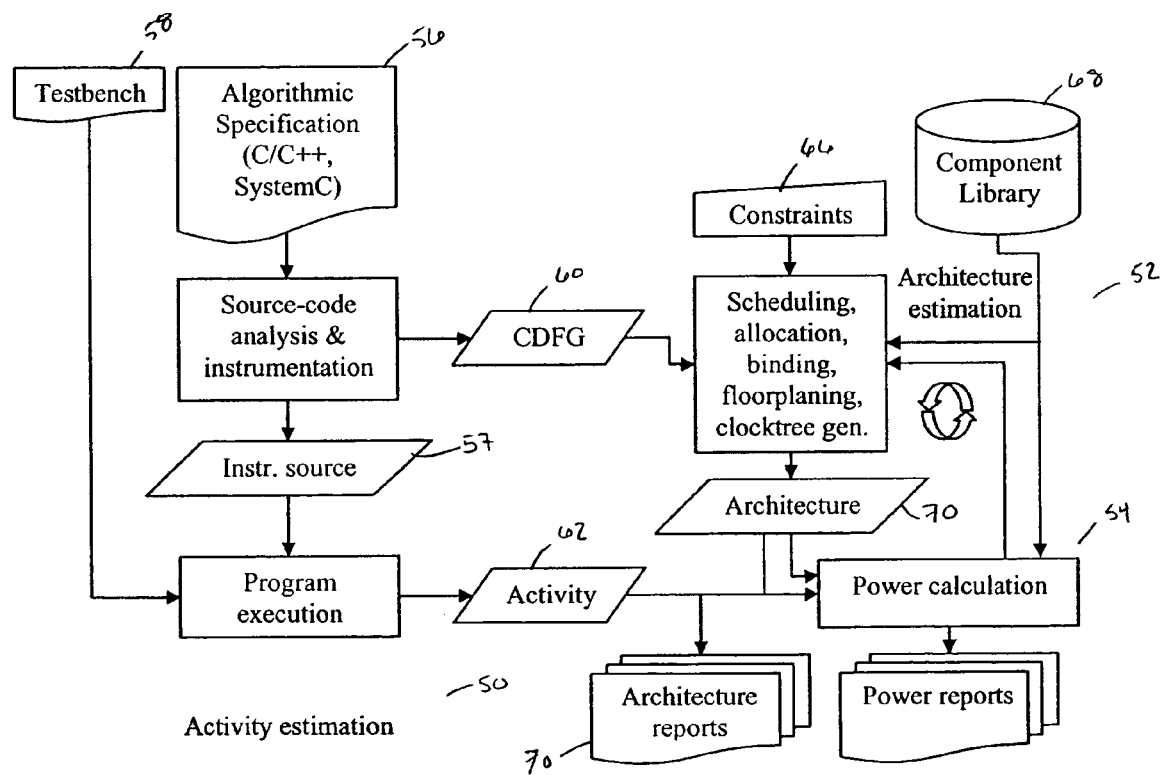
FIG. 5 is a block diagram of the tool structure for an algorithmic-level power estimator.

Additionally, power models for the components must be available. In case of standard components these models can be generated by simulation and power characterization based on lower level power analysis tools and appropriate power models [Ref. 28: Von Cölln, G., Kruse, L., Schmidt, E., Stammermann, A., and Nebel, W., Power Macro-Modelling for Firm-Macros, in *Proc. PATMOS*, Göttingen, September, 2000.], [Ref. 29: Schmidt, E., von Cölln, G., Kruse, L., Theeuwen, F., and Nebel, W., Automatic Nonlinear Memory Power Modelling, in *Proc. Design, Automation and Test in Europe (DATE)*, Munich, March, 2001.]. Hence, algorithmic-level power analysis includes the following general operations: architecture estimation (scheduling, allocation, binding of operations and memory accesses, communication architecture estimation including wire length prediction), activation estimation, and power model evaluation. The structure of an algorithmic-level power estimator tool that performs these functions is shown in FIG. 5. The details of this tool will be provided later.

The main challenge of algorithmic-level power estimation for hardware implementations is the difficulty of predicting the structural and physical properties of a yet to be designed power optimized circuit. Existing approaches to solve this problem rely on a power optimizing architectural synthesis of the design before power analysis. The accuracy of the power analysis depends on how well the assumed architecture matches the final architecture. This final architecture is subject to many parameters, e.g. the design style specific architecture templates, which are the main differentiating factors in times of fabless semiconductor vendors, or the tool chain applied at the later phases of the design process (RT-level synthesis, floorplanning, routing, clock tree generation). Hence, an architecture estimator should either consider the design flow and style applied to the real design, or generate an architecture of such high quality that it can be implemented without further changes.

Target Architecture

Figure 6:
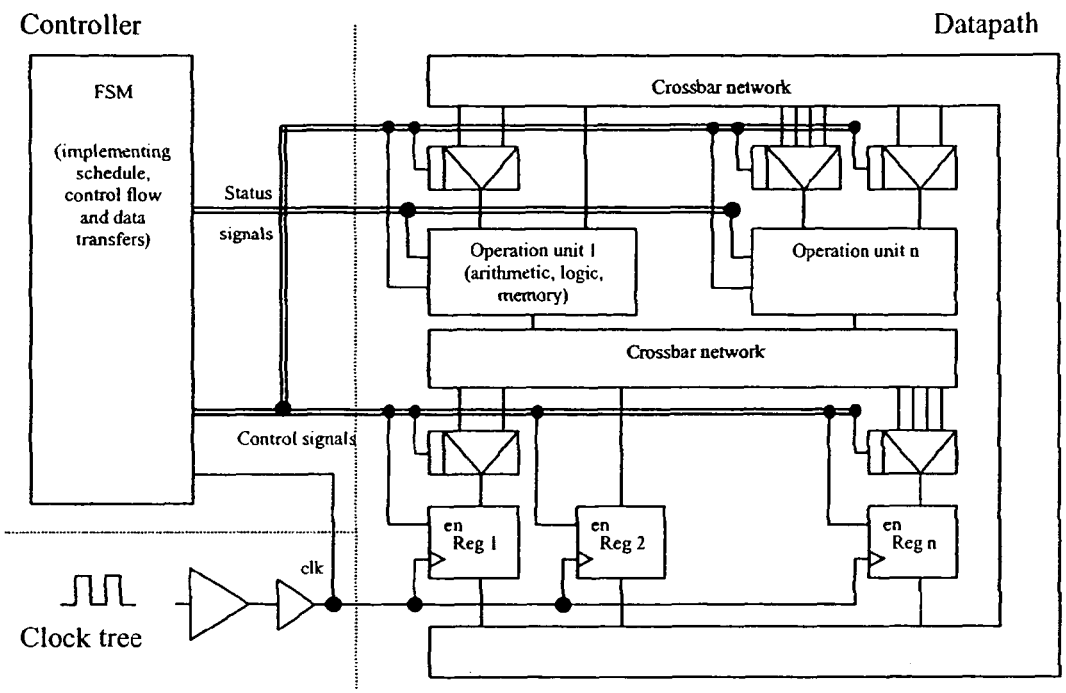
FIG. 6 is a generic target architecture template.

Architectural synthesis maps a CDFG onto an architecture template. FIG. 6 shows such a generic target architecture for the HW implementation of a CDFG. It consists of three parts: the datapath, which implements the dataflow of the CDFG, the controller, which organizes the dataflow and the control flow, and the clock tree. It is the task of the architecture synthesis to schedule the operations under timing and resource constraints, as well as to allocate the required resources in terms of operation units. The operation units can be arithmetic or logic modules as well as memories. One result of the architecture synthesis is the set of operation units and registers allocated as well as the steering logic, which implements the data transfer connections between the operation units and the registers. The second output is the controller, which is a state machine generating the necessary control signals to steer the multiplexers, operation units, and enable signals of the registers. To be able to do so, it needs to implement the control flow and the schedule based on the status signals of comparator operation units in the datapath. Early work on architectural synthesis for low power has analyzed the impact of binding and allocation during high-level synthesis on the power consumption and integrated power optimizations into high level synthesis tools [Ref. 22], [Ref. 30: Martin, R. S., and Knight, J. P., Power-Profiler: Optimizing ASICs Power Consumption at the Behavioral Level, in *Proc. Design Automation Conference*, San Francisco, June, 1995.].

Scheduling

The schedule of a datapath defines at which control step each of the operations is performed. It has an impact on the power consumption. It defines the level of parallelism in the datapath and hence the number of required resources. The schedule determines the usage of pipelining and chaining. While pipelining can be a means to reduce power by isolating the propagation of unnecessary signal transitions even within one operation unit, chaining causes the propagation of such glitches through several operation units in one clock cycle and hence increase the power consumption. Musoll et al. [Ref. 31: Musoll, E. and Cortadella, J., Scheduling and Resource Binding for Low Power, in *Proc. Int. Symposium on System Synthesis*, Cannes, September, 1995.] have proposed an approach to utilize operations of the CDFG with multiple fan-outs to reduce the power consumption by binding the successor nodes of the CDFG to the same resource in consecutive control steps if they are operationally compatible. This reduces the input activity of these operation units.

Resource Allocation Binding and Sharing

The allocation of resources defines which and how many resources are to be used to implement the CDFG. The binding assigns exactly one operation unit to each of the operations of the CDFG. Several operations can be assigned to the same operation unit if they are scheduled into disjoint control steps and the operation belongs to a subset of the operations which can be implemented by the same unit. These operation units are pre-designed and power-characterized modules, like multipliers, memories, adders, ALUs, comparators, subtractors etc.

The valid set of target units of the resource binding depends on the set of operations these units can perform. This opens further possibilities for power optimization, because more than one type of operation unit can be chosen as target unit, influencing the resulting power consumption. For example, an addition can be bound to a carry-look-ahead adder, a carry-save adder or an ALU. Similarly, variables and arrays can be mapped to registers or memories. Typically, arrays will be mapped to memories while single variables will be mapped to registers.

The resource allocation and binding affects the power consumption of the datapath due to several effects. The power consumption of each operation unit strongly depends on the switching activity of its inputs. In a routine processing real input data, the internal data applied to the operation units will usually not be independent, but highly correlated in a similar way over a wide range of input data. Applying consecutive input data of high correlation to an operation unit reduces its power consumption. An established measure for the input switching activity is the average Hamming Distance of a sequence of input patterns [Ref. 28]. Analyzing the input streams of the operations allows assigning the operations to operation units in a power optimized way by exploiting these data correlations. Since this assignment is an NP-complete problem, different heuristics have been proposed. Khouri et al. [Ref. 32: Khouri, K. S., Lakshminarayana, G., and Jha, N. K., Fast High-level Power Estimation for Control-flow Intensive Designs, in *Proc. International Symposium on Low Power Electronics and Design*, Monterey, August, 1998.] uses an activity matrix to capture this data dependency and includes control flow information and state transition probabilities into the power analysis, while Kruse et al. focuses on the iterative nature of data dominated designs [Ref. 33: Kruse, L., Schmidt, E., Jochens, G., Stammermann, A., Schulz, A., Macii, E., and Nebel, W., Estimation of Lower and Upper Bounds on the Power Consumption from Scheduled Data Flow Graphs, *IEEE Trans. On Very Large Scale Integration (VLSI) Systems*, Vol. 9, No. 1, February, 2001.].

Behavioral-Level Power Estimation

In addition to the operations discussed in the previous sub-section, an algorithmic specification and its CDFG may contain calls to non-standard functions, e.g. combinational logic functions, which are defined by their input/output behavior. Since these are not part of the power-characterized library, they require a special treatment during algorithmic-level power estimation. Two main approaches are possible in principle: synthesis or complexity estimation.

The most accurate results could be achieved by a fully optimized synthesis of the function under observation. This large synthesis effort may be prohibitive for quick turn-around times desired when exploring the algorithmic-level design space. A quick synthesis can be a work-around if it is combined with a calibration procedure, which reliably estimates possible further improvements from the outcome of the quick synthesis. It is obvious, that this approach lacks accuracy while delivering relatively fast results.

The second approach builds on complexity estimates. Müller-Glaser et al. [Ref. 34: Müller-Glaser, K. D., Kirsch, K., and Neusinger, K., Estimating Essential Design Characteristics to Support Project Planning for ASIC Design Management, in *Proc. Int. Conference on Computer Aided*

*Design*, San Jose, November 1991.] integrated an area and power estimator into a design planning and management tool. Its input is the expected number of gate equivalences, which is empirically calibrated with respect to design styles, tool flow, and technology to produce area and power estimates. This approach is also used in the spreadsheets mentioned earlier. If the required estimate of the number of gates needed is not available, because, for example, no experience exists for a new application, information theoretic approaches step in.

Their input is the functional I/O behavior of a module. A key indicator of the computational complexity and thus of the energy required, is the entropy. The entropy is a measure of uncertainty. The larger the uncertainty of the function's result is, the larger will be the effort to compute this value. The entropy of a module output can thus be used as an indicator of its computing power consumption [Ref. 35: Marculescu, D., Marculescu, R., and Pedram, M., Information Theoretic Measures of Energy Consumption at Register Transfer Level, in *Proc. International Symposium on Low Power Electronics and Design*, Dana Point, April, 1995.], [Ref. 36: Nemani, M., and Najm, F. N., High-Level Area and Power Estimation for VLSI Circuits, in *Proc. Int. Conference on Computer Aided Design*, San Jose, November, 1997.], [Ref. 37: Ferrandi, F., Fummi, F., Macii, E., Poncino, M., and Sciuto, D., Power Estimation of Behavioral Descriptions, in *Proc. Design, Automation and Test in Europe (DATE)*, Paris, March, 1998.].

Controller Power Estimation

Scheduling, resource allocation, and binding have defined the requirements for the controller. Yet, its structure and implementation are still to be determined. The power consumption of the controller (see FIG. 6) depends on its implementation, i.e., the number of registers and their activity, the implementation of the state-transition and output functions, and their signal probabilities. As with the behavioral-level power estimation, a full controller synthesis will deliver the most accurate controller model, which can be used for power analysis.

In order to reduce the power estimation time, empirical power models [Ref. 27] which use regression techniques to generate power models for controllers can be used.

The input parameters for the regression include: the number of states, inputs, outputs, and the state coding as well as the input signal probabilities, which can be extracted from the schedule, the status and control signals.

Interconnect Power Estimation

So far the algorithmic-level power estimation of software and the various hardware components of an embedded system have been discussed. These components can be separately analyzed or estimated once they have been allocated and their input activity was captured. The power consumption of the communication between these components and their synchronization by the clock, however, requires physical information of the placement of these components and their interconnect as well as their clock tree. It is important to consider the effect of the interconnect on the total power consumption during the different steps of the architecture definition. A power aware interconnect design can significantly reduce the total power consumption of the system. For example, [Ref. 38: Zhong, L., and Jha, N. K., Interconnect-aware High-level Synthesis for Low Power, in *Proc. Conference on Computer Aided Design*, San Jose, November, 2002.] and [Ref. 39: Stammermann, A., Helms, D., Schulte, M., and Nebel, W., Interconnect Driven Low Power High-Level Synthesis, in *Proc. PATMOS*, Torino, September, 2003.] report power reductions of more than 20% by an interconnect aware high-level synthesis for low power.

This interconnect aware power optimization requires an estimation technique for the interconnect and its power consumption. The interconnect power models applied so far are based on the switched capacitance of the wires, as formulated in Eq. 1. For a global power estimate it is sufficient to estimate the total switched capacitance. Empirical wire models like Rent's Rule [Ref. 40: Christie, P., and Stroobandt, D., The Interpretation and Application of Rent's Rule, *IEEE Transactions on VLSI Systems*, Vol. 8, No. 6, December, 2000.] can be applied to predict the number and average length of wires. However, since a power estimate of an optimized floorplan is needed, this average figure is too pessimistic. Such a power optimal floorplan will locate components, which are communicating at a high data rate as close together as possible and thus save power. Hence, to steer interconnect power optimization, the capacitance and switching activity of individual wires should be known.

The problem of interconnect power estimation is to estimate the capacitance and activity of each wire of a RT-level architecture. Since the activity can be derived from the activity data of the modules, which have been discussed previously, the remaining problem is to estimate the wire capacitance which is primarily determined by the wire's length, the physical layers used to implement the wire, and the number of vias. The wire length depends on the location of the modules of the design on the floorplan and the routing structure between the modules. The capacitance of a wire, including the effects of vias and multiple connection layers, typically correlates with the wire's length in a non-linear way [Ref. 41: Stammermann, A., Helms, D., Schulte, M., Schulz, A., and Nebel, W., Binding, Allocation and Floorplanning in Low Power High-Level Synthesis, in *Proc. Int. Conference on Computer Aided Design*, San Jose, November 2003.]. Hence, the main problem remaining is to calculate the expected length of each wire in a power-optimized floorplan. This requires including floorplanning and routing into the estimation. Because of the large impact of the floorplan on the total power consumption, a separated floorplanning phase, once the architecture is fixed, will create suboptimal solutions. Existing approaches, which consider interconnect power during power analysis and optimization at the system-level and algorithmic-level, attack the problem by integrating floorplanning and routing into the architecture optimization discussed above.

Traditionally high-level synthesis consists of the phases: allocation, scheduling, and binding, which are typically performed in a sequential manner. High-level synthesis for low power adds a further step: interconnect optimization. Each of these steps is a NP-complete problem, thus the entire problem is np-complete, i.e., a guaranteed optimal solution cannot be found in reasonable computation time. An optimal design can further not be achieved by applying these steps sequentially, basically, because the optimizations are not independent. Consequently, since power analysis at this level requires a detailed understanding of the target architecture, heuristics are needed to synthesize such architecture in a power-optimized way under simultaneous consideration of allocation, scheduling, binding, and floorplanning.

First approaches to combine several of these tasks of high-level synthesis into one optimization loop have been proposed [Ref. 38], [Ref. 41], [Ref. 42: Prabhakaran, P, Banerjee, P., Crenshaw, J., and Sarrafzadeh, M., Simultaneous Scheduling, Binding and Floorplanning for Interconnect Power Optimization, in *Proc. VLSI Design*, Goa, January, 1999.].

The common feature of these optimization flows is to apply a set of moves on a preliminary design, to evaluate the impact of these moves, and following an optimizing heuristic like, e.g. simulated annealing, applying further moves until a stopping criterion is fulfilled.

Prabhakaran et al. [Ref. 42] apply moves changing the schedule and the binding. Before evaluating the cost function, they perform a floorplanning step during each iteration. Zhong et al. [Ref. 38] use allocation and binding moves followed by a floorplanning for cost estimation.

Figure 7:
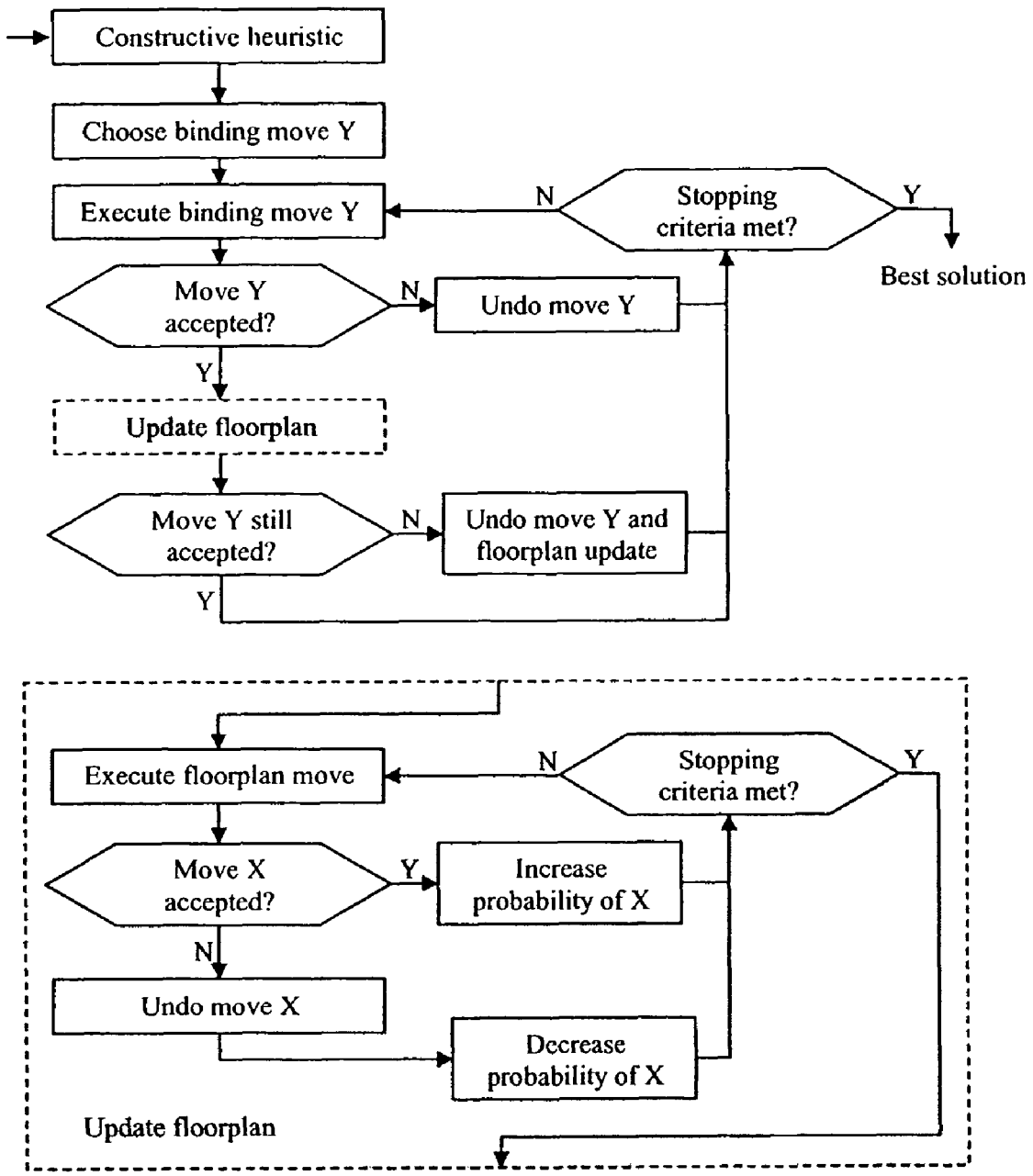
FIG. 7 shows a flow chart of a process for simultaneous allocation, binding and floorplaning for low power.

Stammermann et al. [Ref. 41] include allocation, binding and floorplanning moves in their optimization heuristics (see FIG. 7). The upper part of the figure shows the outer loop of the optimization, during which binding and allocation moves are preformed. If, based on a preliminary power estimate, a binding/allocation move is promising, then the floorplan is updated and optimized by several floorplan moves in an inner loop, as shown in the lower part of FIG. 7. In this case, the moves consist of resource allocation (sharing/splitting) and binding moves as well as floorplan related moves. The results show a significant improvement compared to interconnect unaware power optimization. (This is further described in German Patent Application DE 103 24 565.0 filed May 30, 2003 and corresponding U.S. patent application Ser. No. 10/857,212, both of which are incorporated herein by reference.)

The floorplan and the allocated registers are also the basis for the generation of a clock tree model, which can be used for clock power prediction.

The result is a power-optimized architecture automatically generated from an algorithmic-level description. The expected power consumption of this architecture is analyzed during the optimization loops. This power figure will have a high relative accuracy and can serve as an estimate of the power consumption of the input algorithm. It can be taken as a guide for optimizing the input algorithm for low power.

If, however, the implementation style assumed during the optimization fits the implementation style of the final SoC design, and the architectural parameters (allocation, scheduling, binding, and floorplanning) of the generated architecture are applied to the final implementation, then the power estimate is a good prediction of the absolute power consumption to be expected for the design.

The Algorithmic-Level Power Estimation Tool

The principles discussed above are embodied in the estimation tool shown in FIG. 5. The tool includes three main components, namely, an activity estimator 50, an architecture estimator 52, and a power calculation module or power estimator 54. These elements combined with a library of power models for macro modules 68 make up the key elements of the algorithmic-level power estimation flow. Activity estimator 50 takes as input an algorithmic or pre-implementation specification 56, which is, for example, in the C/C++ or System C languages, and a testbench specification 58; it analyzes and automatically instruments the algorithmic specification; and it generates a Control Data Flow Graph (CDFG) 60, which is needed for optimization, and an activity profile 62 that contains complete data traces of at least portions of the algorithm. The code instrumentation inserts protocol statements, which capture activity of the algorithm during execution. Architecture estimator 52, using constraints supplied by a constraints library 66 and component models from a component library 68, iteratively estimates or predicts an architecture 70 based on power calculations performed by the power estimator 54. Power estimator 54 combines the activity profile 62, which was generated from the instrumented algorithm, with the predicted architecture 70 from architecture estimator 52 and the component models from components library 68 to estimate power consumption of the predicted architectures. The power estimations are fed back to architecture estimator 52 to enable iterative modifications toward a more optimal low power design.

The power estimation tool is largely implemented by code which runs on a platform that includes one or more processors or CPUs, local memory, and data storage for storing the code which implements the functionality described herein. The tool provides a computational framework and user interface which integrates the techniques presented above into an EDA tool. In particular, the power estimation tool provides a language front-end which allows reading algorithmic specifications in a suitable language. In the example tool structure shown in FIG. 4, the front-end includes a language parser which extracts the CDFG 60 of the algorithm and automatically instruments the source code. The system-level designer then executes the instrumented source code 57 with application stimuli or other representative testbenches 58. During execution the values of the variables and the input and output vectors or operations are captured in an activity file. This activity can be attributed to the respective resources of the datapath and interconnect for later power calculation.

The top right hand part of FIG. 5 represents the architecture estimation function. It is key that the estimated architecture is optimized for low power. Hence, it constructs a datapath and respective controller that minimizes the switching activity. As described above, iterative optimization techniques have to be applied to generate a power efficient resource allocation, scheduling, binding, and floorplanning. This iterative procedure employs a feed-back from intermediate power estimates of the temporary solutions as indicated in FIG. 5.

Once a stable solution has been found, its power consumption can be presented to the designer in various views to give him a fast feed-back on the ramifications of design decisions.

The accuracy of the power analysis depends on how well the assumed architecture matches the final architecture. This final architecture is subject to many parameters, e.g. the design style specific architecture templates which are the main differentiating factors in times of fables semiconductor vendors, or the tool chain applied at the later phases of the design process (RT-level synthesis, floorplaning, routing, clock tree generation). Hence, an architecture estimator should either consider the design flow and style applied to the real design, or generate an abstract architecture of such high quality that it can be implemented without further global changes, however, without limiting local optimizations. In FIG. 5, the architecture output contains such a description of the architecture.

Activity Estimator:

Activity estimator operates before hardware has been inferred. Thus, the activity is independent of the compete hardware that is inferred. This means that in evaluating the different design options one can change the inference of the hardware without having to perform another simulation of the system. It is straightforward to estimate the activity of the algorithm simply by executing the algorithm and sampling the activity of the variables and operations of the algorithm. This process is automated by an automatic instrumentation of the source code. This instrumentation takes care of capturing the data streams during execution.

Pre-Implementation Specification:

Pre-implementation specification 56 is a specification of a system or part of a system on a level of abstraction that does not incorporate aspects of its eventual hardware implementation. The input specification for algorithmic-level power estimation is typically an executable specification in terms of a programming or system-level design language, e.g. C or SystemC. The eventual goal of the tool is to estimate the power consumed by a hardware implementation of the system specified.

Testbench:

Testbenches are prominent concepts in hardware description languages. A testbench models the environment of a system (as described in pre-implementation specification 56) and its interaction with the system. In state of the art design flows, it is used for the purpose of verifying the system by means of simulation. During simulation the testbench injects stimuli (i.e. data) into the system under test and reports and/or asserts the system's responses. By providing the stimuli, the testbench fully defines the dynamic behaviour of a deterministic system under test. Different testbenches on the other side can stimulate the system under test in a different way and lead to different behavior.

In the methodology around the described embodiment, pre-implementation specification 56 and the testbench 58 form one joint executable specification. Quite often testbenches read their stimuli from a disk file. Herein this file is considered to be part of the definition of the testbench.

Source Code Analysis and Code Instrumentation:

During source code analysis the (lexical and) syntactic content of pre-implementation specification 56 is analyzed. This process is called parsing. During parsing control and dataflow is extracted from the specification and brought into a suitable representation. Source code analysis is a well-established technique in the domain of compilers [Ref. 1].

Code instrumentation is a technique to obtain dynamic information about the execution of computer code. The basic concept is to add statements to the original code to protocol such information and then execute this "instrumented" version of the code 57. Code instrumentation is a well-established technique, for example widely used for code profiling (i.e. analyzing the execution time and frequency of code passages).

The instrumented code is based on the original pre-implementation specification. It is equivalent with respect to the originally specified functionality. The code is simply extended by statements which protocol the occurring data at run-time.

In the described embodiment, this phase of the process protocols (excerpts of) complete data traces during simulation. A trace of a process is generally defined as a finite sequence of visible events representing the behaviour of the process up to a certain point in time. The following is a very simple example that illustrates what that means in this context.

Assume that the original program reads as follows:
1: x=a+b
2: y=x*c
3: x=x+3

Figure 8:
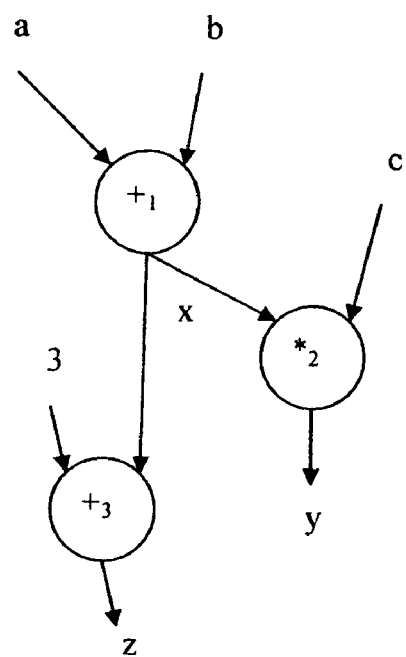
FIG. 8 shows the control data flow graph of the sample algorithm.

A CDFG of this would look as shown in FIG. 8.

Once instrumented it would look like the following:
1: x=a+b
1a: write_file(x)
2: y=x*c
2a: write_file (y)
3: z=x+3
3a: write_file(z)

where "write_file(x)" means write the content of variable "x" to a file.

If it is assumed that the algorithm is executed two times in a row with the input values a=3, b=5, c=2 and a=1, b=1, c=4 respectively, then the background file would look like:

x: 8, y: 16, z: 1, x: 2, y: 8, z: 5

This output is what is referred to as a "complete data trace" because it is representation of all of the data "flowing" through the design. There is no abstraction performed.

This is to be contrasted with an alternative approach in which one simply counts the number of executions for every operation. In the present example, for example, this would be: adding 1 two times ($+_1$: 2 times); multiplying by 2 two times ($*_2$: 2 times); and adding 3 two times ($+_3$: 2 times). This prior approach would not store any information about the data computed.

Another alternative approach computes some statistic about the variables, for example, the average value. Again, referring to the present example, this would be: x: 5; y: 12; and z: 8.

Figure 9:
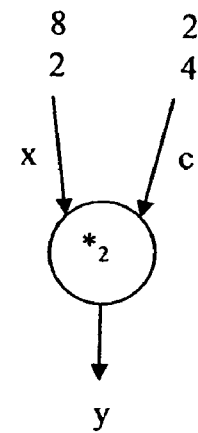
FIG. 9 shows the data streams at the inputs of the multiplier operation.

Using the approach described herein, one can reconstruct the complete data stream at the input of every operation. For example, for the inputs of $*_2$: 8 then 2 for the left input "x" and 2 then 4 for the right input "c", as shown in FIG. 9.

Figure 10:
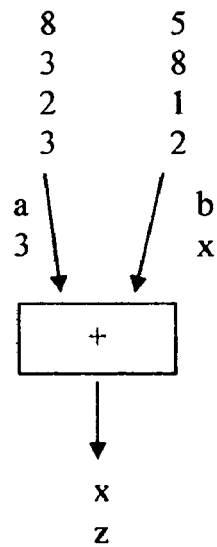
FIG. 10 shows the data streams for the inputs of the combined adder.

Now imagine the designer decides (after the simulation!) to use an architecture with only one adder for the additions $+_1$ and $+_3$. From the trace, it can then be deduced which data streams the adder would have to compute, namely, the ones shown in FIG. 10.

Figure 11:
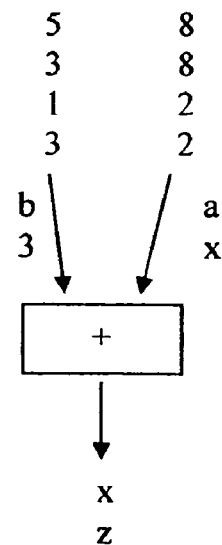
FIG. 11 shows the data streams for the inputs of the combined adder with the "a" and "b" inputs switched.

In a similar manner, it is possible to compute all kinds of scenarios mapping the source code operations onto target architecture and still be able to predict the exact data streams flowing through the design. Thus, this approach is very flexible in terms of reflecting the impact of varying architectures. It enables one to see what happens when inputs are swapped. For example, if inputs "a" and "b" in the case shown above are swapped, as shown in FIG. 11, it is easy to predict the new data streams.

Though such changes do not look drastic, they can have a significant impact on the power. Taking the right input, for example, as a result of the swap it is now unchanging for two cycles. This will probably mean a reduction of the switching activity related power consumption.

Protocoling the entire operation of the algorithm can produce a very large amount of data which can slow the process down. But in fact, not all of the data is actually required. Reducing the amount of data is accomplished by sampling the portions of the simulation in the manner described by Lars Kruse in EP 1 168 206, entitled "Process to Analyze the Power Dissipation of an Electric Circuit," filed Jun. 20, 2001, and incorporated herein by reference. In essence, one gathers enough samples to reflect correlations that occur and samples randomly enough to avoid artifacts from the sampling behavior. Similarly, one can also reduce the computational burdens by focusing on specifying and coding only those parts of the functional design that have most relevance to power consumption.

According to the approach described by Lars Kruse, one makes two copies of the algorithm, one that is instrumented and the one that is not. Then, one selects which one to run. To gather a data trace sample, one runs the instrumented algorithm and to avoid generating a data trace, one runs the regular algorithm. By appropriately selecting the number of samples taken and the times at which they are taken, one can produce enough data for the power estimation and design process described herein.

Program Execution:

This phase involves translating testbench 58 and instrumented code 57 into an executable/simulatable form and the subsequent execution/simulation. Due to the instrumentation, this step will produce the same output as the original specification plus a profile of the activity of the circuit as background files, i.e., activity profile 62.

Note that the execution/simulation is performed based on an algorithmic, pre-implementation specification. This means that the aspects of the concrete hardware implementation do not express themselves in the results of the simulation.

Activity Profile:

Activity profile 62 contains: (1) information about the sequence of execution of statements of the original specification; and (2) information about the data processed by these statements. It has the form of one or several files. Note that while item (1) is a typical type of information for instrumentation, item (2) is rather specific to the problem of power estimation, as it is necessary to estimate the switching activity in the circuits here. Note that both kinds of information come from the execution/simulation of an abstract, i.e. not implementation-related, specification. The activity observed in an eventual hardware implementation of the specification can therefore not be trivially deduced from this activity profile.

Architecture Estimator:

The refinement process from an algorithmic description to an register transfer level architecture is called behavioural synthesis or high-level synthesis (e.g. [Ref. 17]). The three main problems to be solved during high-level synthesis are: scheduling, allocation and binding. Scheduling is the process of fixing the execution time for each operation. Allocation refers to defining the number of hardware functional units of each type. Binding is the process of assigning a number of operations to each hardware functional unit.

Based on the design representation (e.g. CDFG 60) and constraints 66 and the cost models in component library 68, the architecture estimator predicts the power relevant aspects of the result of high-level synthesis for the specification initially given. It does not necessarily generate a complete architecture in full detail.

Generating an abstract architecture for low power ASIC-style implementations of computational kernels requires applying the usual steps of high-level synthesis, however, under circumstances of a cost function that includes the expected power consumption. The computational kernel is typically computation intensive and hence implemented by a custom datapath with a respective controller, as shown in FIG. 2.

Target Architecture Template:

The power very much depends on the type of hardware assumed as target for synthesis. The target architecture template is basically a "finite state machine driven data path". The particular template shown in FIG. 2 is a classical high-level synthesis template. This particular template is used in the described embodiment, but there are other templates that are known to persons familiar with design practice and that could be used here. For example, another template that is used by other approaches is basically a software processor with some additional hardware. Usually the templates evolve from the design practice and once they are widely used they are considered for design automation.

The target architecture template includes: a data path made up hardware functional units like arithmetic units, logic and memory; a controller that coordinates activity of the hardware functional units; registers for storing the intermediate values; and a crossbar switch network for interconnecting the units.

Design Representation:

The algorithm under consideration is represented by its Control and Dataflow Graph (CDFG) [Ref. 21], [Ref. 22]. CDFGs are commonly used representations of systems at the algorithmic level (e.g. [Ref. 2: Smith, G., ASIC Design Times Spiral out of Control, Gartner Dataquest, 2002]). The design representation used here contains the control and dataflow dependencies found in the specification of the system.

The operations of the CDFG are scheduled into control steps and the CDFG is mapped to a target architecture. This mapping requires allocating the necessary resources, binding the operation nodes of the CDFG to these resources in a power-optimized way, and developing the respective controller. Due to strong dependence between the schedule, the resource allocation, the resource binding and the floorplan, these steps should ideally be performed in a combined optimization step. Approaches to combine several of these tasks of high-level synthesis into one optimization loop have been proposed [Ref. 38], [Ref. 41], [Ref. 42]. The common feature of these optimization flows is to apply a set of moves on a preliminary design, to evaluate the impact of these moves, and following an optimizing heuristic like, e.g. simulated annealing, applying further moves until a stopping criterion is fulfilled.

The performance of most heuristic optimization algorithms depends on the quality of the initial state before applying any of the moves. In case of architectural-level power optimization, this initial configuration includes a schedule, a set of allocated resources, an initial binding, and a floor plan.

During scheduling, each operation node of the CDFG is assigned to:

exactly one control step, or in case of chaining, to an execution position within one control step, or in case of pipelining, to a sequence of control steps.

The resulting schedule defines the level of parallelism in the datapath and hence the number of required resources. The schedule determines the usage of pipelining and chaining. While pipelining can be a means to reduce power by isolating the propagation of unnecessary signal transitions even within one operation unit, chaining causes the propagation of such glitches through several operation units in one clock cycle and hence increases power consumption.

Power-aware scheduling avoids the allocation of resource compatible computations with low correlation of the operand values in neighboring control steps. It rather tries to allocate operations with highly correlated data into consecutive steps [Ref. 31]. This strategy allows binding these operations to the same H-W resource, which will consume less power due to the low activity of its inputs.

The allocation of resources defines which and how many resources are used to implement the CDFG. The binding step assigns exactly one operation unit to each of the operations of the CDFG. Several operations can be assigned to the same operation unit (resource sharing) if they are scheduled into disjoint control steps and the operation belongs to a subset of the operation that can be implemented by the same unit.

The valid set of target units of the resource binding depends on the set of operations these units can perform. This opens further possibilities for power optimization because more than one type of operation unit can be chosen as a target unit, influencing the resulting power consumption. For example, an addition can be bound to a carry-look-ahead adder, a carry-save adder or an ALU. Similarly, variables and arrays can be mapped to registers or memories. Typically, arrays will be mapped to memories while single variables will be mapped to registers.

The resource allocation and binding affects the power consumption of the datapath due to several effects. The power consumption of each operation unit strongly depends on the switching activity of its inputs. When processing real application data, the internal data applied to the operation units will usually not be independent, but highly correlated over a wide range of input data. Applying consecutive input data of high correlation to an operation unit reduces its power consumption. An established measure for the input switching activity is the average Hamming-Distance of a sequence of input patterns [Ref. 28]. Analyzing the input streams of the operations allows assigning the operations to operation units in a power optimized way by exploiting these data correlations. Since this assignment is an NP-complete problem, different heuristics have been proposed. The approach in [Ref. 32] uses an activity matrix to capture this data dependency and includes control flow information and state transition probabilities into the power analysis, while another proposal focuses on the iterative nature of data dominated designs [Ref. 33].

By sequentially applying these techniques an initial schedule and architecture can be generated, which, however, is not a global optimum solution, but which can serve as a good initial solution for simultaneous optimization described above.

So far only the architecture of the datapath and its floorplan have been estimated. The power consumption of the controller depends on its implementation, i.e., the number of registers and their activity, the implementation of the state-transition and output functions, and their signal probabilities, which are known after the architecture estimation process described above.

Constraints:

In addition to the system specification and the testbench, the constraints form the third kind of input provided by the user. Constraints are the standard means to direct the automated translation of an abstract design specification into a more concrete one ("synthesis"). They prevent undesirable solutions by blocking parts of the design space. Examples for constraints in the described methodology are: maximum number of functional resources allowed, and maximum number of clock steps allowed.

Component Library:

The component library contains models of the timing, area, and power consumption of the hardware functional units. It is used to determine the different cost aspects of design solutions.

Power Models:

The operation units used in the generate architecture are pre-designed and power-characterized modules, like multipliers, memories, adders, ALUs, comparators, subtractors, etc. In case of standard components these models can be generated by simulation and power characterization based on lower level power analysis tools and appropriate power models [Ref. 28], [Ref. 29]. These power models should be parameterized with respect to structural aspects, e.g. bit-width, and activity parameters. The Hamming-Distance between consecutive input vectors has proven to be a reliable parameter to capture the input activity for such modules. Alternatively, higher order functions of the switching probability distribution of input signals, e.g. momentums, have been applied as parameters of high-level power models for macro modules [Ref. 17: Garcia Ortiz A., Kabulepa, L., Murgan, T., Glesner, M., Moment Based Power Estimation in Very Deep Submicron Technologies, in *Proc. ACM/IEEE Int. Conference on Computer Aided Design*, San Jose, November 2003].

The interconnect power depends on the topology of individual wires and their activity. Hence, power models for interconnects are parameterized by the wire length and the signal activity. These models need to be calibrated with respect to the placement and routing tools used as well as with the process technology. Such empirical models can include estimators for wire topology and the number of vias [Ref. 29].

Architecture:

The architecture output 70 is the predicted architecture and it is a representation of the relevant aspects of the register transfer level architecture.

Power Estimator:

Power calculator 54 estimates the power consumption of predicted architecture 70 based on activity profile 57 and the power models in component library 68. This calculator includes a component, which derives the real data streams at the inputs of components from to data streams of individual operations contained in activity profile 62. This capability is very specific to our approach to the problem and might turn out as the key feature for discrimination.

The architecture prediction generates the following information for each operation of the source code: (1) the clock step in which the execution of the operation is started ("schedule"); and (2) the instance of a computational resource on which it is executed ("binding"). The simulation/instrumentation produces an activity profile that includes: (1) a valid sequence of execution of the operations; and (2) an ordered list of data vectors consumed and/or produced by each operation. Component library 68 contains: (1) information about the delay of components; and (2) models for computing their power consumption.

Based on these categories of information, the power estimation is performed by executing the following steps:
1. time stamp adaptation;
2. vector merge; and
3. application of models, each of which will now be described in greater detail.

Time Stamp Adaptation

In this operation, each data vector is assigned a time stamp that denotes the time the vector would have been produced had the predicted architecture been simulated, as opposed to the algorithm. To accomplish this, the operations are visited in the order denoted by the information that was generated by the above-mentioned simulation/instrumentation, namely, the valid sequence of execution of the operations. A time-counter is used during the process to time stamp the operations. For every operation, the correct time is computed by combining the information from the time counter and the clock step assigned by the schedule produced by the architecture prediction phase.

This can be better understood with the aid of the following example. Assume the algorithm from the previous example:
1: x=a+b
2: y=x*c
3: x x+3

Figure 12:
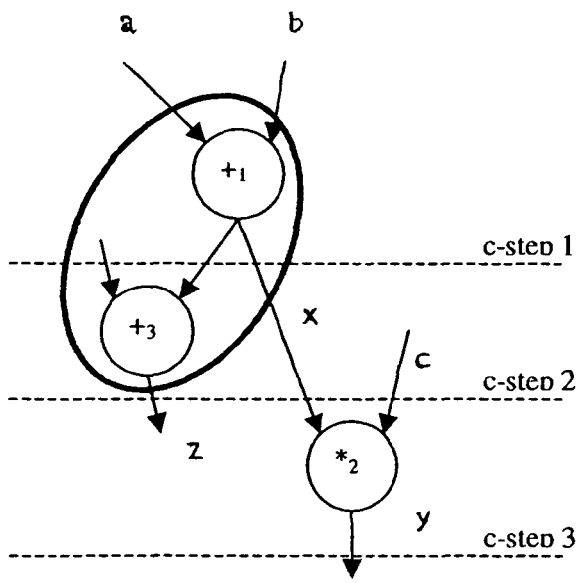
FIG. 12 shows a scheduled and bound version of the dataflow graph of FIG. 8.

Recall that the CDFG for this algorithm is shown in FIG. 8. A scheduled and bound version of this graph is shown in FIG. 12. (Note that the addition and multiplication have been swapped in sequence with respect to the original code). The oval around the two addition operations indicates that both additions are bound to one adder. This graph represents a visual presentation of the information from the architecture prediction, namely, the schedule and the binding.

For this example, assume that the clock period is 100 ns and the delay of the adder is 5 ns. Recall that the values of x are 8 followed by 2; and the values of z are 11 followed by 5 (i.e., these are the ordered lists of data vectors produced by the simulation/instrumentation phase. The sequence of operations denoted by the activity profile for this example is exactly the sequence of the source code (note: it would differ if branches, like loops or if-statements, were present).

Assume that the first iteration of the algorithm starts at t=0. According to the execution sequence as shown in FIG. 12, one arrives at the first add operation (i.e., $+_1$) first. Given that the delay of the adder is 5 ns, the time stamping process assigns a time of 5 ns (i.e., t=5 ns) to the output x (i.e., "8") (write: ("8", 5 ns)). Next, the execution sequence continues with the subsequent add operation (i.e., $+_3$), scheduled one clock step (i.e., 100 ns) later. At this point, the time stamping process assigns the first value at the output of the adder (i.e., output z) a time equal to 0 ns+100 ns+5 ns=105 ns. The execution sequence then continues to the multiple operation (i.e., $*_2$).

After processing the first iteration of the algorithm, the time stamping process at some point moves on to the second iteration. Assume the second iteration starts at t=1000 ns. During this next iteration, the time stamping process again arrives at arrive at the first add operation (i.e., $+_1$) and assigns the time t=1005 ns to the second output value (i.e., "2"). After the execution of this next iteration of the algorithm is complete, the adapted complete vector list for x would look like: {("8", 5 ns), ("2", 1005 ns)}. The list for z would look like {("11", 10 ns), ("5", 1105 ns)}.

Vector Merge

This operation merges the vector lists that would be mapped on the same functional resources. In other words, the vector merge operation produces the timed vector lists that would be visible at the input of the hardware functional units. So, this operation does the transition from algorithmic operations to hardware resources.

For example, the timed vector lists from the previous step would be the following:

a: {("3", 0 ns), ("1", 1000 ns)}
b: {("5", 0 ns), ("1", 1000 ns)}
x: {("8", 5 ns), ("2", 1005 ns)}
3: {("3", 100 ns), ("3", 1100 ns)}

For the right input of the adder, when the vector lists are merged, the resulting timed vector list would be:

("5", 0 ns), ("8", 5 ns), ("1", 1000 ns), ("2", 1005 ns)

And for the left input of the adder, the merged timed vector list would be:

("3", 0 ns), ("3", 100 ns), ("1" 1,000 ns), ("3" 1100 ns)

These lists represent the real vectors that would be coming into the adder if the target architecture was simulated.

Application Models

Given the timed vector lists at the input of the hardware functional units, power models are now simply applied to get an estimate of power consumption.

An example of a simple power model is a function of the total Hamming distance of the vectors. (Note: The Hamming distance of a pair of vectors is the number of differing bits in binary representation. The total Hamming distance of a vector list is the sum of Hamming distances of consecutive vector pairs.) For the adder mentioned above, this would be:

$$Hd\_total=Hd(5,8)+Hd(8,1)+Hd(1,2)+Hd(3,3)+Hd(3,1)+Hd(1,3)$$

$$Hd\_total=3+2+2+0+1+1=9,$$

where "Hd" is the Hamming distance.

A power model (or precisely the energy model) looks like this:

$$Energy=c*Hd\_total,$$

where the value of c is stored in component library 68. Assuming, for example, c=0.1 μWs:

$$Energy=0.1 \mu Ws*9=0.9 \mu Ws$$

Architecture Report:

As an optional output of the methodology, architecture reports 70 are generated presenting the architecture predicted and used to obtain the power estimate.

Power Reports:

Also, generated power reports 72 give a detailed analysis of the power consumption of the design under the assumption that it is implemented in the architecture given in generated architecture reports 70.

Other embodiments are within the following claims.

What is claimed is:

1. A method of designing a low power circuit that implements specified functionality, said method comprising:
   analyzing code for an algorithmic description of the specified functionality to generate a design representation of the circuit at an algorithmic level;
   instrumenting the code for the algorithmic description so as to capture data streams during execution/simulation of the algorithmic description;
   executing/simulating the instrumented code to generate an activity profile for the algorithmic description, wherein said activity profile includes at least portions of data traces of at least a portion of the executed algorithmic description;
   using the design representation to generate an initial hardware design that is an estimate of hardware resources necessary to implement at least some of the specified functionality;
   providing power models for the hardware resources; and
   computing power consumption for the initial hardware design based on the activity profile and the power models for the hardware resources.

2. The method of claim 1, wherein the activity profile includes a complete data trace of at least a portion of the executed algorithmic description.

3. The method of claim 1, wherein the activity profile includes samples of a data trace of at least a portion of the executed algorithmic description.

4. The method of claim 1, wherein the generated initial hardware design is an estimate of hardware resources necessary to implement all of the specified functionality.

5. The method of claim 1, further comprising, based on the activity profile and the initial hardware design, iteratively modifying a derived hardware design to arrive at a final hardware design that is optimized for low power, wherein iteratively modifying involves using the activity profile to compute a power consumption estimation for the derived hardware design at multiple iterations of the design.

6. The method of claim 5, wherein iteratively modifying involves using the activity profile to compute a power consumption estimation for the derived hardware design at each iteration of the design.

7. The method of claim 6, wherein iteratively modifying involves using the activity profile and the power models for the hardware resources to compute a power consumption estimation for the derived hardware design at each iteration of the design.

8. The method of claim 5, wherein using the design representation to generate the initial hardware design involves using the design representation to allocate and schedule operations of the algorithmic description among the hardware resources.

9. The method of claim 1, wherein the initial hardware design includes a schedule, a set of allocated resources, a binding, and a floorplan.

10. The method of claim 1, wherein the design representation is a control data flow graph.

11. The method of claim 1, wherein the algorithmic description does not carry implementation-related information.

12. The method of claim 1, wherein the activity profile is generated without reference to a hardware description.

13. The method of claim 1, wherein the activity profile contains (1) information about the sequence of an execution of statements of the algorithmic description; and (2) information about data processed by those statements.

14. The method of claim 5, further comprising outputting the final hardware design that is optimized for low power.

15. A system for designing a low power circuit that implements specified functionality, said system comprising:
a processor system; and
a storage system storing:
an activity estimator module programmed to cause the processor system to:
analyze code for an algorithmic description of the specified functionality to generate a design representation of the circuit at the algorithmic level;
automatically instrument the code for the algorithmic description so as to capture data streams during execution of the algorithmic description; and
execute the instrumented code to generate an activity profile for the algorithmic description, wherein said activity profile includes data traces of at least a portion of the executed algorithm;
an architecture estimator module programmed to cause the processor system to use the design representation and a target architecture template to generate an initial hardware design that is an estimate of hardware resources necessary to implement the specified functionality, said storage system also storing power models for the hardware resources; and
a power estimator module programmed to cause the processor system to compute power consumption for the initial hardware design based on the activity profile and the power models for the hardware resources.

16. The system of claim 15, wherein the architecture estimator and the power estimator modules are programmed to cause the processor system to, based on the activity profile and the initial hardware design, iteratively modify a derived hardware design to arrive at a final hardware design that is optimized for low power, wherein iteratively modifying involves using the activity profile to compute a power consumption estimation for the derived hardware design at multiple iterations of the design.

17. The system of claim 16, wherein the architecture estimator and the power estimator modules are programmed to cause the processor system to iteratively modify the derived hardware design by using the activity profile to compute a power consumption estimation for the derived hardware design at each iteration of the design.

18. The system of claim 17, wherein the architecture estimator and the power estimator modules are programmed to cause the processor system to iteratively modify the derived hardware design by using the activity profile and the power models for the hardware resources to compute a power consumption estimation for the derived hardware design at each iteration of the design.

19. The system of claim 16, wherein the architecture estimator module is programmed to cause the processor system to use the design representation to allocate and schedule operations of the algorithmic description among the hardware resources.

20. The system of claim 15, wherein the activity profile includes a complete data trace of at least a portion of the executed algorithmic description.

21. The system of claim 15, wherein the activity profile includes samples of a data trace of at least a portion of the executed algorithmic description.

22. The system of claim 15, wherein the generated initial hardware design is an estimate of hardware resources necessary to implement all of the specified functionality.

23. The system of claim 15, wherein the design representation is a control data flow graph.

24. The system of claim 15, wherein the algorithmic description does not carry implementation-related information.

25. The system of claim 15, wherein the activity profile is generated without reference to a hardware description.

26. The system of claim 15, wherein the activity profile contains (1) information about the sequence of an execution of statements of the algorithmic description; and (2) information about data processed by those statements.

27. The system of claim 15, wherein the initial hardware design includes a schedule, a set of allocated resources, a binding, and a floorplan.

* * * * *